United States Patent
Cheng et al.

(10) Patent No.: US 11,859,117 B2
(45) Date of Patent: Jan. 2, 2024

(54) PREPARATION METHOD FOR QUANTUM DOTS

(71) Applicant: TCL TECHNOLOGY GROUP CORPORATION, Huizhou (CN)

(72) Inventors: Luling Cheng, Huizhou (CN); Yixing Yang, Huizhou (CN)

(73) Assignee: TCL TECHNOLOGY GROUP CORPORATION, Huizhou (CN)

( * ) Notice: Subject to any disclaimer, the term of this patent is extended or adjusted under 35 U.S.C. 154(b) by 618 days.

(21) Appl. No.: 17/043,636

(22) PCT Filed: Oct. 9, 2019

(86) PCT No.: PCT/CN2019/110190
§ 371 (c)(1),
(2) Date: Sep. 29, 2020

(87) PCT Pub. No.: WO2020/073926
PCT Pub. Date: Apr. 16, 2020

(65) Prior Publication Data
US 2021/0017449 A1    Jan. 21, 2021

(30) Foreign Application Priority Data

Oct. 9, 2018 (CN) .......................... 201811173288.7
Oct. 9, 2018 (CN) .......................... 201811173294.2

(51) Int. Cl.
*C09K 11/88* (2006.01)
*C01B 19/00* (2006.01)
(Continued)

(52) U.S. Cl.
CPC .......... *C09K 11/883* (2013.01); *C01B 19/007* (2013.01); *C09K 11/025* (2013.01);
(Continued)

(58) Field of Classification Search
CPC . C09K 11/883; C09K 11/025; C01P 2004/80; C01P 2004/64; B82Y 20/00; B82Y 40/00
See application file for complete search history.

(56) References Cited

U.S. PATENT DOCUMENTS

2014/0001405 A1* 1/2014 Guo .................... C09K 11/565
                                                             423/299
2017/0335187 A1   11/2017 Guo et al.

FOREIGN PATENT DOCUMENTS

CN        101260294 A      9/2008
CN        104498039 A      4/2015
(Continued)

OTHER PUBLICATIONS

World Intellectual Property Organization (WIPO) International Search Report for PCT/CN2019/110190 dated Dec. 30, 2019 6 Pages.
(Continued)

*Primary Examiner* — C Melissa Koslow
(74) *Attorney, Agent, or Firm* — ANOVA LAW GROUP, PLLC

(57) ABSTRACT

The present application discloses a preparation method for quantum dots (QDs). The method includes providing initial QD cores, and mixing the initial QD cores with an organic carboxylic acid to bond the organic carboxylic acid to the surface of the initial QD cores; preparing a shell layer on the surface of the initial QD cores in a shell-growth reaction system containing an organic carboxylic acid; and mixing and heating the solution system, obtained after a completion of shell-layer growth reaction, with an organic amine, an organic phosphine, or a mixed solution of the organic amine and the organic phosphine.

18 Claims, 1 Drawing Sheet

(51) Int. Cl.
*C09K 11/02* (2006.01)
*B82Y 20/00* (2011.01)
*B82Y 40/00* (2011.01)

(52) U.S. Cl.
CPC .............. *B82Y 20/00* (2013.01); *B82Y 40/00* (2013.01); *C01P 2004/64* (2013.01); *C01P 2004/80* (2013.01)

(56) References Cited

FOREIGN PATENT DOCUMENTS

| | | | |
|---|---|---|---|
| CN | 106010511 | A | 10/2016 |
| CN | 106590619 | A | 4/2017 |
| CN | 107522723 | A | 12/2017 |
| CN | 107629783 | A | 1/2018 |

OTHER PUBLICATIONS

Jianhai Zhou et al., "Ideal CdSe CdS Core Shell Nanocrystals Enabled by Entropic Ligands and Their Core Sizeú¼Shell Thickness and Ligand-Dependent Photoluminescence Properties", JACS Journal of the American Chemical Society, Nov. 2, 2017.

Sukanta Dolai et al., "Isolation of Bright Blue Light-Emitting CdSe Nanocrystals with 6.5 kDa Core in Gram Scale High Photoluminescence Efficiency Controlled by Surface Ligand Chemistry", CM Chemistry of Materials, Dec. 16, 2013.

Jan Ziegler, "Preparation and application of nanocrystals for white LEDs", School of Chemical Sciences and Pharmacy University of East Anglia, Oct. 2007.

Niu Yuan, "The synthetic control of excitons in coreshell quantum dots", China Academic Journal Electronic Publishing House, http://www.cnki.net.

* cited by examiner

PREPARATION METHOD FOR QUANTUM DOTS

CROSS-REFERENCE TO RELATED APPLICATIONS

This application is a national phase entry under 35 U.S.C. § 371 of International Application No. PCT/CN2019/110190, filed on Oct. 9, 2019, which claims the priority and benefits of Chinese Patent Application Nos. CN201811173288.7 and CN201811173294.2, both filed on Oct. 9, 2018, the entirety of all of which is incorporated herein by reference.

FIELD OF THE DISCLOSURE

The present disclosure relates to the field of nanocrystalline material preparation and, more particularly, relates to a method for preparing quantum dots.

BACKGROUND

Nanoscience and nanotechnology are an emerging science and technology with potential application value and economic benefits, and thus are of interest to scientists worldwide. Compared to bulk materials, nanocrystals (NCs) can exhibit electrical, optical, magnetic, and electrochemical properties that bulk materials do not possess. Semiconductor nanocrystals, also known as quantum dots (QDs), have sizes ranging from 1 to 20 nm, and when the particle size changes, the valence band and conduction band of the semiconductor nanocrystals also change (quantum size effect). For example, the absorption and emission of CdSe nanocrystals cover almost the entire visible spectrum range. Therefore, semiconductor nanocrystals exhibit the phenomenon of size dependent photoluminescent properties. Semiconductor nanocrystals have been used in many technical fields such as biomarkers, diagnostics, chemical sensors, light emitting diodes, electroluminescent devices, photovoltaic devices, lasers, electronic transistors, etc. However, different classes of semiconductor QDs need to be prepared for applications in different technical fields. The preparation of high-quality semiconductor QDs is a prerequisite for the effective application of the size effect of semiconductor QDs.

In the past few decades, in order to obtain high-quality semiconductor nanocrystals, scientific researchers have developed many methods. The existing technologies mainly include surface ligand modification and core-shell structure design. In the design of the core-shell structure, it is relatively common that the core is a narrow band gap semiconductor material and the shell is a wide band gap material. The synthesis methods of this type of core-shell structure mainly include one-step method, two-step method and three-step method. Among them, the one-step method refers to that the core-shell QDs grow the cores and also grow the shells in a reaction vessel. The two-step method refers to that the preparation of the core-shell QDs includes two steps: the growth of the cores is carried out in a reaction vessel, and the QD cores are taken out and then placed in another reaction solvent for the growth of the shells. The three-step method refers to that the preparation of core-shell QDs including three steps: the growth of the cores is carried out in a reaction vessel, the QD cores are taken out and then placed in another reaction solvent for the growth of intermediate shells, and the core-shell QDs containing the intermediate shells are taken out and placed in a third reaction vessel for the growth of the outermost shells. At present, generally, the shell growth method used to prepare core-shell structure QDs, whether it is a one-step shell growth method, a two-step shell growth method, or a three-step shell growth method, is simply using a shell-source precursor for continuous injection growth. This method cannot control the growth quality of the shells well, such that the obtained core-shell structure QDs have fewer surface ligands, resulting in poor solubility. Therefore, it is of great significance to study the shell growth mode of core-shell QDs and the control of shell growth.

Technical Problems

One of the purposes of the embodiments of the present application is to provide a method for preparing QDs, aiming to solve the problem that, in existing technology, core-shell structure QDs, prepared by the method of continuously injecting a shell-source precursor for growth, have fewer surface ligands and poor solubility, or to solve the problem that in existing technology, core-shell structure QDs, prepared by the method of continuously injecting a shell-source precursor for growth, have relatively large lattice stress and more surface lattice defects, thereby affecting the fluorescence intensity.

Technical Solutions

In order to solve the technical problems described above, the technical solutions adopted in the embodiments of the present disclosure include:

The present disclosure provides a preparation method for core-shell structure QDs, including the following exemplary steps:

Providing initial QD cores, mixing the initial QD cores with an organic carboxylic acid, so that the organic carboxylic acid is bonded to the surface of the initial QD cores.

Preparing a shell layer on the surface of the initial QD cores, where the step of preparing the shell layer on the surface of the initial QD cores is performed in a shell-growth reaction system containing the organic carboxylic acid;

Mixing and heating the solution system, obtained after the completion of the shell-layer growth reaction, with an organic amine;

Or, mixing and heating the solution system, obtained after the completion of the shell-layer growth reaction, with an organic phosphine;

Or, mixing and heating the solution system, obtained after the completion of the shell-layer growth reaction, with a mixed solution of an organic amine and an organic phosphine;

Or including the following exemplary steps:

Providing initial QD cores, mixing the initial QD cores with an organic amine, so that the organic amine is bonded to the surface of the initial QD cores.

Performing a shell-layer growth reaction on the surface of the initial QD cores to prepare a shell layer;

Mixing and heating the solution system, obtained after the completion of the shell-layer growth reaction, with an organic carboxylic acid;

Or, mixing and heating the solution system, obtained after the completion of the shell-layer growth reaction, with an organic phosphine;

Or, mixing and heating the solution system, obtained after the completion of the shell-layer growth reaction, with a mixed solution of an organic carboxylic acid and an organic phosphine.

The beneficial effect of the preparation method for QDs provided in the examples of the present application is as follows. The initial QD cores are mixed with an organic carboxylic acid, and the organic carboxylic acid tends to bind to the surface of the cations of the initial QD cores, such that the organic carboxylic acid is bonded to the surface of the initial QD cores to fill the cationic vacancies of the QD cores, thereby reducing the defect states at the interface between the core and the shell, and providing a desired epitaxial interface for the growth of the shell layer. At the same time, the organic carboxylic acid can also have the effect of passivating the surface of the QD cores, so that the QD cores will not self-mature in the stage of heating up to the shell-growth temperature, and thus QDs with uniform particle size are obtained. In the subsequent shell-growth process, the organic ligands obtained after pyrolysis of the shell-source anionic precursor and the shell-source cationic precursor, together with the organic carboxylic acid in the shell-growth reaction system, are bonded to the surface of the shell layer, making the prepared core-shell structure QDs have desired monodispersity. After the growth of the shell layer is completed, the system obtained after the completion of the shell-layer growth reaction is further mixed with at least one of an organic phosphine and/or an organic amine for subsequent treatment. Here, when the system obtained after the completion of the shell-layer growth reaction is mixed with an organic phosphine for subsequent treatment, the organic phosphine is bonded to the non-metallic elements on the surface of the nanocrystalline shell layer to passivate the anionic vacancies, and thus reduce the defect states on the surface of the core-shell nanocrystals and further increase the fluorescence intensity of the core-shell structure QDs; when the system obtained after the completion of the shell-layer growth reaction is mixed with an organic amine for subsequent treatment, the organic amine can complex with the residual cationic precursor in the mixed solution of the core-shell structure QDs, thereby reducing the freezing point of the cationic precursor, and thus further conducive to the subsequent cleaning of the QDs and the improvement of the purity. Therefore, when used to form a device film layer, the prepared QDs can effectively avoid the influence of the residual cationic precursor impurities in the solution of the core-shell structure QD on the stability of the device, and improve the film-forming quality of the QD solid films.

Alternatively, the initial QD cores are mixed with an organic amine, and the organic amine is bonded to the surface of the initial QD cores to fill the cationic vacancies of the initial QD cores, thereby reducing the defect states at the interface between the core and the shell, and providing a desired epitaxial interface for the growth of the shell layer. Further, because the binding force between the organic amine and the metal atoms on the surface of the QD cores is relatively weak, the organic amine requires less energy to be desorbed from the metal atoms on the surface of the previous shell layer. During the subsequent shell-growth process, the anions in the shell-source precursor are easier to be bonded to the metal ions on the surface of the cores for epitaxial growth, which may avoid the large lattice stress between the atoms at the interface between the QD cores and the shell layer, thereby reducing the presence of lattice defects on the surface of the epicrystalline shell layer. In addition, due to the dipole effect of the amino functional group of the organic amine, the shell layer is driven to grow according to the crystal orientations of the QD cores during epitaxial crystallization, such that the shell layer obtained by the shell growth is consistent with the crystal form of the QD cores, which further reduces the lattice defects between the atoms on the surface of the QD cores and the shell layer. After the growth of the shell layer is completed, the system obtained after the completion of the shell-layer growth reaction is further mixed with at least one of an organic phosphine and/or an organic carboxylic acid for subsequent treatment. Here, when the system obtained after the completion of the shell-layer growth reaction is mixed with an organic phosphine for subsequent treatment, the organic phosphine is bonded to the non-metallic elements on the surface of the nanocrystalline shell layer to passivate the anionic vacancies, and thus reduce the defect states on the surface of the core-shell nanocrystals and further increase the fluorescence intensity of the core-shell structure QDs; when the system obtained after the completion of the shell-layer growth reaction is mixed with an organic carboxylic acid for subsequent treatment, the organic carboxylic acid can effectively eliminate the protonated organic amine connected to the surface of the core-shell structure nanocrystalline shell layer (in the process of modifying the QD cores with an organic amine, a portion of the organic amine falls off and, in the subsequent shell-growth process, binds to the surface of the growing metal atoms. Although most of the organic amine is removed during the shell-growth process, a portion of the organic amine is still bonded to the surface of the metal atoms of the shell layer without being removed from the surface; the portion of the organic amine that has not fallen off will eventually form a protonated organic amine), thereby reducing the charged organic amine ligands on the surface of the core-shell structure nanocrystals, which further reduces the excitons (electrons) generated by the core-shell structure nanocrystals when emitting light being trapped by the charged organic amine ligands on the surface. Therefore, the effect of this post-treatment is to further improve the transient fluorescence lifetime of the core-shell structure nanocrystals.

BRIEF DESCRIPTION OF THE DRAWINGS

In order to more clearly explain the technical solutions in the embodiments of the present application, the following will briefly introduce the drawings needed in the embodiments or exemplary technical descriptions. Obviously, the drawings in the following description are only some embodiments of the present application, and for those of ordinary skill in the art, without paying any creative labor, other drawings can be obtained based on these drawings.

EMBODIMENTS OF THE PRESENT DISCLOSURE

In order to make the purpose, technical solutions, and advantages of the present application more clear, the following describes the present application in further detail with reference to the drawings and embodiments. It should be understood that the specific embodiments described here are only used to explain the application, and are not used to limit the application.

In the description of the present application, it should be understood that the terms "first" and "second" are used for description purposes only, and cannot be understood as indicating or implying relative importance or implicitly specifying the number of the indicated technical features. Thus, the features defined as "first" and "second" may explicitly or implicitly include one or more of the features. In the description of the present application, the meaning of "plurality" is two or more, unless otherwise specifically limited.

Figure 1:
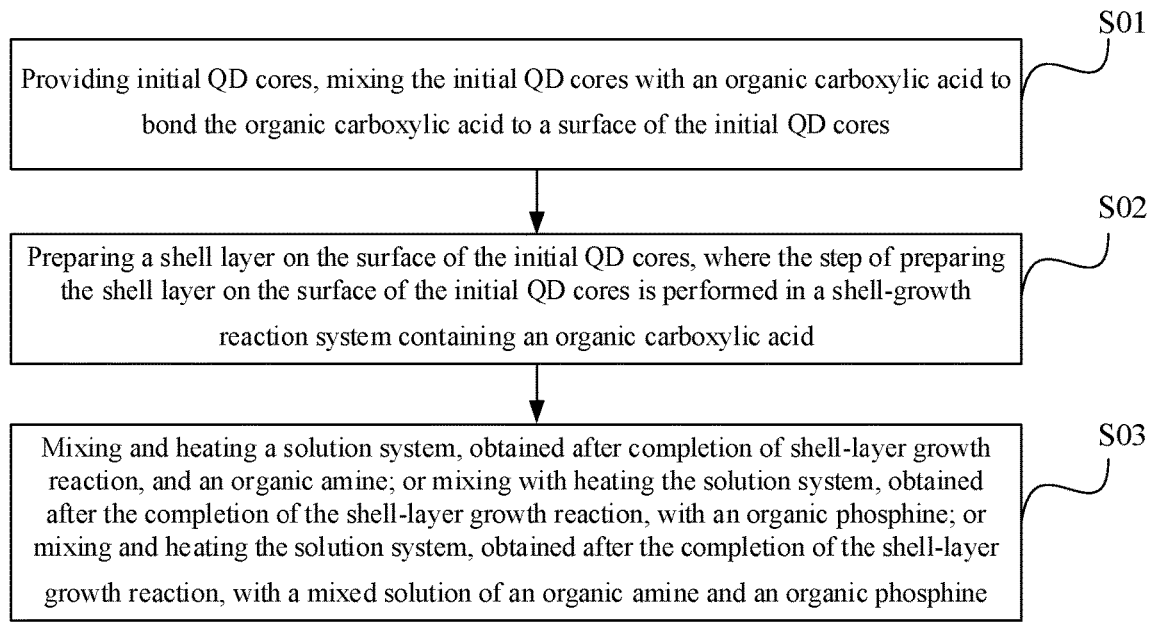
FIG. 1 illustrates a schematic flow chart of a method for preparing core-shell structure QDs provided by an embodiment of the present application.

In the first aspect, as shown in FIG. 1, the embodiments of the present application provide a method for preparing core-shell structure QDs, including the following steps:

S01, providing initial QD cores, mixing the initial QD cores with an organic carboxylic acid, so that the organic carboxylic acid is bonded to the surface of the initial QD cores;

S02, preparing a shell layer on the surface of the initial QD cores, where the step of preparing the shell layer on the surface of the initial QD cores is performed in a shell-growth reaction system containing the organic carboxylic acid;

S03, mixing and heating the solution system, obtained after the completion of the shell-layer growth reaction, with an organic amine;

Or, mixing and heating the solution system, obtained after the completion of the shell-layer growth reaction, with an organic phosphine;

Or, mixing and heating the solution system, obtained after the completion of the shell-layer growth reaction, with a mixed solution of an organic amine and an organic phosphine.

According to the method for preparing QDs provided in the examples of the present application, the initial QD cores are mixed with an organic carboxylic acid, and the organic carboxylic acid tends to bind to the surface of the cations of the initial QD cores, such that the organic carboxylic acid is bonded to the surface of the initial QD cores to fill the cationic vacancies of the QD cores, thereby reducing the defect states at the interface between the core and the shell, and providing a desired epitaxial interface for the growth of the shell layer. At the same time, the organic carboxylic acid can also have the effect of passivating the surface of the QD cores, so that the QD cores will not self-mature in the stage of heating up to the shell-growth temperature, and thus QDs with uniform particle size are obtained. In the subsequent shell-growth process, the organic ligands obtained after pyrolysis of the shell-source anionic precursor and the shell-source cationic precursor, together with the organic carboxylic acid in the shell-growth reaction system, are bonded to the surface of the shell layer, making the prepared core-shell structure QDs have desired monodispersity.

After the growth of the shell layer is completed, the system obtained after the completion of the shell-layer growth reaction is further mixed with at least one of an organic phosphine and/or an organic amine for subsequent treatment. Here, when the system obtained after the completion of the shell-layer growth reaction is mixed with an organic phosphine for subsequent treatment, the organic phosphine is bonded to the non-metallic elements on the surface of the nanocrystalline shell layer to passivate the anionic vacancies, and thus reduce the defect states on the surface of the core-shell nanocrystals and further increase the fluorescence intensity of the core-shell structure QDs; when the system obtained after the completion of the shell-layer growth reaction is mixed with an organic amine for subsequent treatment, the organic amine can complex with the residual cationic precursor in the mixed solution of the core-shell structure QDs, thereby reducing the freezing point of the cationic precursor, and thus further conducive to the subsequent cleaning of the QDs and the improvement of the purity. Therefore, when used to form a device film layer, the prepared QDs can effectively avoid the influence of the residual cationic precursor impurities in the solution of the core-shell structure QD on the stability of the device, and improve the film-forming quality of the QD solid films.

For example, in an embodiment of step S01, the initial QD cores may be at least one selected from but not limited to group II/VI QD cores, group III/V QD cores, group III/VI QD cores, and group II/III/VI QD cores. As an example, the group II/VI QD cores may be selected from but not limited to CdS, CdSe, CdTe, ZnS, ZnSe, ZnTe, HgS, HgSe, HgTe, CdZnSe, CdSSe, ZnSSe, ZnCdS, ZnCdSe, ZnSeS, ZnCdTe, ZnCdSSe, ZnCdSeS, and ZnCdTeS; the group III/V QD cores may be selected from InAs, InP, GaAs, GaP, GaSb, InSb, AlAs, AlP, AlSb, InGaAs, GaAsP and InAsP, but not limited to thereto; as an example, the group III/VI QD cores may be selected from but not limited to InS, In2S3, InSe, In2Se3, In4Se3, In2Se3, InTe, In2Se3, GaS, Ga2Se3, GaSe, Ga2Se3, GaTe, Ga2Te3; the group QD cores may be selected from but not limited to CuInS, CuInZnS, and CuInSeS. In some embodiments, the initial QD cores may be selected from group II/VI QD cores.

In some embodiments, the initial QD cores are initial QD cores containing surface ligands. The surface ligand may be at least one selected from an organic carboxylic acid ligand, an organic phosphonic acid ligand, an organic phosphine ligand, and a phosphine oxide ligand. For example, the organic carboxylic acid ligand may be selected from but not limited to at least one of oleic acid, tetradecanoic acid, and dodecanoic acid; the organic phosphonic acid ligand may be selected from but not limited to at least one of octadecylphosphonic acid, tetradecylphosphonic acid, and dodecylphosphonic acid; the organic phosphine ligand may be selected from but not limited to at least one of trioctylphosphine and tributylphosphine; and the phosphine oxide ligand may be selected from but not limited to at least one of trioctylphosphine oxide and tributylphosphine oxide.

In step S01, the initial QD cores are mixed with an organic carboxylic acid, and the organic carboxylic acid tends to bind to the surface of the cations of the initial QD cores, such that the organic carboxylic acid is bonded to the surface of the initial QD cores to fill the cationic vacancies of the QD cores, thereby reducing the defect states at the interface between the core and the shell, and providing a desired epitaxial interface for the growth of the shell layer. At the same time, the organic carboxylic acid can also have the effect of passivating the surface of the QD cores, so that the QD cores will not self-mature in the stage of heating up to the shell-growth temperature, and thus QDs with uniform particle size are obtained. In the subsequent shell-growth process, the organic ligands obtained after pyrolysis of the shell-source anionic precursor and the shell-source cationic precursor, together with the organic carboxylic acid in the shell-growth reaction system, are bonded to the surface of the shell layer, making the prepared core-shell structure QDs have desired monodispersity.

In some embodiments, the organic carboxylic acid may be selected from organic carboxylic acids having 8 to 18 carbon atoms. At this time, it has a relatively small steric hindrance, which facilitates the binding of the organic carboxylic acid to the surface of the initial QD cores. Further, the organic carboxylic acid may be selected from linear organic carboxylic acids containing a single carboxyl group. The linear organic carboxylic acids are beneficial to reducing steric hindrance and promoting the occurrence of passivation. For example, the organic carboxylic acid may be at least one selected from oleic acid, dodecanoic acid, tetradecanoic acid, hexadecanoic acid, and octadecanoic acid.

In step S01, in some embodiments, in order to facilitate the organic carboxylic acid to be sufficiently and stably bonded to the surface of the initial QD cores, in the step of mixing the initial QD cores with the organic carboxylic acid, the mixing conditions are as follows: the initial QD cores are mixed with the organic carboxylic acid, and heated at a temperature condition of 80~150° C. for 20~60 minutes to bond the organic carboxylic acid to the surface of the initial QD cores.

In step S01, in some embodiments, the initial QD cores may be formulated into a solution and mixed with the organic carboxylic acid. In some embodiments, in order to make the initial QD cores uniformly dispersed in the solvent (the initial QD cores are individually present in the solution and maintain a proper distance from each other), provide a desired condition for the growth of the shell layer on the surface of the QD cores, and obtain a shell layer with desired dispersion and a uniform thickness, in the initial QD core solution, the ratio of the mass of the initial QD cores to the volume of the solvent may be 10 mg:(5~15) ml.

In step S01, in some embodiments, in the step of mixing the initial QD cores with the organic carboxylic acid, according to a mass-molar ratio of 10 mg:(3~10) mmol between the QD cores and the organic carboxylic acid, the initial QD cores may be dispersed into a solution containing the organic carboxylic acid for surface modification of the initial QD cores. In order to ensure that the organic carboxylic acid is fully bonded to the initial QD cores and reduce the defect states on the surface of the initial QD cores, the organic carboxylic acid reagent may have a certain amount of excess. However, the excessive amount of the organic carboxylic acid reagent may not be too much, otherwise the viscosity may be too large, which may affect the subsequent shell-layer growth rate, and may be detrimental to the formation of the shell layer.

In one embodiment, in step S02, the step of preparing the shell layer on the surface of the initial QD cores may be performed in a shell-growth reaction system containing the organic carboxylic acid. For example, in one embodiment, when the organic carboxylic acid added in step S01 is excessive, the organic carboxylic acid in the shell-growth reaction system may come from step S01, that is, the initial QD cores may be mixed with the organic carboxylic acid such that the remaining materials after the step of bonding the organic carboxylic acid to the surface of the initial QD cores may include the organic carboxylic acid; when the organic carboxylic acid added in step S01 is not excessive, or although the organic carboxylic acid added in step S01 is excessive, the organic carboxylic acid becomes insufficient as the growth of the shell layer proceeds, adding an appropriate amount of an organic carboxylic acid to the shell-growth reaction system may also be possible during the process of preparing the shell layer on the surface of the initial QD cores, such that a sufficient amount of carboxylic acid may be bonded to the surface of the growing shell layer, making the prepared QDs have desired monodispersity. Of course, it should be noted that a specific kind of shell-source anionic precursor (e.g., a complex precursor formed by a non-metallic element. such as Te, Se, S, P, etc. and an oleic acid) and shell-source cationic precursor (zinc oleate, cadmium oleate, etc.), which may produce organic carboxylic acid ligands after pyrolysis, may be selected. It is precisely because this part of the organic ligands produced after pyrolysis are insufficient for fully modifying (especially as the thickness of the shell layer increases) the surface of the growing shell layer, the growth of the shell layer may need to be performed in a shell-growth reaction system that contains an organic carboxylic acid. In the shell-growth reaction system that contains the organic carboxylic acid, the organic carboxylic acid may come from the organic carboxylic acid remained after the step of mixing the initial QD cores with the organic carboxylic acid to bond the organic carboxylic acid to the surface of the initial QD cores, and/or an appropriate amount of the organic carboxylic acid added into the shell-growth reaction system during the shell-growth process.

In one embodiment, in step S02, the shell-growth reaction system may refer to a reaction material system applied in the process of growing a shell layer on the surface of the initial QD cores. In one embodiment of the present application, the shell-source precursor may be injected once into the solution containing the initial QD cores for the growth of a shell layer. In another embodiment of the present application, the shell-source precursor may be injected multiple times into the solution containing the initial QD cores or the shell-growth solution system for the growth of multiple shell layers. For example, a shell-source precursor may be added to the initial QD cores for a first shell growth to prepare a first shell layer; further, on the basis of the first shell layer, a shell-source precursor may be added for a second shell growth to prepare a second shell layer on the surface of the first shell layer; and in this way, after N times of shell growth, an $N^{th}$ shell layer may be prepared. In this embodiment, the surface of each shell layer is combined with the organic carboxylic acid in the shell-growth reaction system and the organic ligands after the pyrolysis of the shell-source anionic precursor and the shell-source cationic precursor, such that after preparing and obtaining each shell layer, the material may have desired monodispersity, which may be conducive to the subsequent growth of the shell layer or having desired dispersion performance as a product application.

In the embodiments of the present application, the shell-source precursor may include a shell-source cationic precursor and a shell-source anionic precursor. Here, the shell-source cationic precursor may be at least one of organic metal carboxylates formed from oxides or metal salts of metals, such as Cd, Zn, Pb, Ag, Hg, Fe, In, Al, etc., and an organic carboxylic acid. Further, the shell-source cationic precursor may be at least one selected from zinc oleate, lead oleate, silver oleate, mercury oleate, indium oleate, copper oleate, iron oleate, manganese oleate, aluminum oleate, zinc stearate, lead stearate, silver stearate, mercury stearate, indium stearate, copper stearate, iron stearate, manganese stearate, aluminum stearate, zinc tetradecanoate, lead tetradecanoate, silver tetradecanoate, mercury tetradecanoate, indium tetradecanoate, copper tetradecanoate, iron tetradecanoate, manganese tetradecanoate, aluminum tetradecanoate, zinc hexadecanoate, lead hexadecanoate, silver hexadecanoate, mercury hexadecanoate, indium hexadecanoate, copper hexadecanoate, iron hexadecanoate, manganese hexadecanoate, aluminum hexadecanoate, zinc dodecanoate, lead dodecanoate, silver dodecanoate, mercury dodecanoate, indium dodecanoate, copper dodecanoate, iron dodecanoate, manganese dodecanoate, aluminum dodecanoate, zinc octadecanoate, lead octadecanoate, silver octadecanoate, mercury octadecanoate, indium octadecanoate, copper octadecanoate, iron octadecanoate, manganese octadecanoate, and aluminum octadecanoate, but not limited thereto. In the embodiments of the present application, after dispersing non-metallic elements such as Te, Se, S, P, etc. into organic molecules to form an anionic complex, the shell-source anionic precursor may be prepared. When the shell-source anionic precursor is an anionic complex formed by non-metallic elements such as Te, Se, S, P, etc. and organic molecules, the organic molecules may be at least one selected from trioctylphosphine, tributylphosphine, oleic acid, and octadecene, but not limited thereto. In the embodiments of the present application, when the anionic precursor is a mercaptan, the organic molecule of the non-metal atom may be an organic molecule containing a single functional group, e.g., the thiol (—HS) functional group (such as octadecanethiol, heptadecanethiol, hexadecanethiol, pentadecanethiol, tetradecanethiol, tridecanethiol, dodecanethiol, octanethiol, etc. but not limited to thereto).

In the embodiments of the present application, the selection of the shell source is not limited. In some embodiments, the band gap of the obtained shell layer may be greater than the band gap of the initial QD cores.

In some embodiments of the present application, the shell-source cationic precursor may be at least one selected from organometallic carboxylates of Cd, Zn, and Pb, and the shell-source anionic precursor may be selected from anionic complexes or thiols formed by dispersing the elements of Te, Se and S into organic molecules.

In the embodiments of the present application, each time the shell source is injected for shell growth, the order of adding the shell-source cationic precursor and the shell-source anionic precursor is not strictly limited. For example, the shell source is a mixed precursor solution in which a shell-source cationic precursor and a shell-source anionic precursor are dispersed; the method of adding the shell source may include: injecting the cationic precursor and the anionic precursor into solvents to respectively prepare a cationic precursor solution and an anionic precursor solution, and injecting the shell-source cationic precursor solution first and then injecting the shell-source anionic precursor solution; or, injecting the cationic precursor and the anionic precursor into solvents to respectively prepare a cationic precursor solution and an anionic precursor solution, and injecting the shell-source anionic precursor solution first and then injecting the shell-source cationic precursor solution; or, injecting the cationic precursor and the anionic precursor into a solvent to prepare a mixed solution containing the cationic precursor and the anionic precursor, and injecting the mixed solution into the solution containing the initial QD cores or the shell-growth solution system.

In some embodiments, the concentration range of the shell-source cationic precursor solution may be (0.5~1.5) mmol/ml; the concentration range of the shell-source anionic precursor solution may be (0.5~1.5) mmol/ml. Proper concentrations may be conducive to the uniform bonding of shell-source cationic precursor and shell-source anionic precursor on the surface of the initial QD cores to form a uniform and stable shell layer through crystallization.

In some embodiments, according to a mass ratio of (1~1.5) mmol:10 mg between the shell-source cationic precursor and the initial QD cores, and/or a mass ratio of (1 1.5) mmol:10 mg between the shell-source anionic precursor and the initial QD cores, the shell-source precursors may be injected into the solution containing the initial QD cores or the shell-growth solution system. The method is conducive to uniform and stable bonding of the anionic precursor and the cationic precursor on the surface of the initial QD cores, and obtaining a shell layer with an appropriate thickness.

Further, the temperature for preparing the shell layer on the surface of the initial QD cores after the modification treatment may be 150~320° C. The temperature range is conducive to crystallization of the anionic and cationic precursors into shells, and does not affect the stability of the QDs.

In step S03, in one embodiment, the solution system obtained after the completion of the shell-layer growth reaction may be mixed with an organic phosphine, such that the organic phosphine may be bonded to the non-metal atoms on the surface of the shell layer of the QDs to reduce the defect states on the surface of the core-shell nanocrystals and further increase the fluorescence intensity of the core-shell structure QDs.

In step S03, in one embodiment, the solution system obtained after the completion of the shell-layer growth reaction may be mixed with an organic phosphine, and heated at a temperature condition of 100~320° C. for 10~60 minutes. Under the condition, the organic phosphine may be bonded to the non-metal atoms on the surface of the shell layer of the QDs to reduce the defect states on the surface of the core-shell nanocrystals and further increase the fluorescence intensity of the core-shell structure QDs. To mix the organic phosphine with the solution system obtained after the completion of the shell-layer growth reaction, when the treatment temperature is too low and/or the time is too short, the organic phosphine may not have a significant effect on passivating the anionic vacancies, and may even not play any passivating role at all, and thus may not be able to increase the fluorescence intensity of the core-shell structure nanocrystals; To mix the organic phosphine with the solution system obtained after the completion of the shell-layer growth reaction, when the treatment temperature is too high, not only the organic phosphine may be easily volatilized, thereby affecting the modification treatment effect, but high temperature condition may affect the structural stability of the core-shell nanocrystals.

In step S03, in the step of mixing and heating the system obtained after the completion of the shell-layer growth reaction with the organic phosphine, in some embodiments, according to a molar-mass ratio of (2~5) mmol:10 mg between the organic phosphine and the initial QD cores, the core-shell structure QDs may be dispersed into a solution containing the organic phosphine. When the content of the organic phosphine is too low, the effect of passivating anionic vacancies may not be significant, and thus it may be difficult to significantly increase the fluorescence intensity of the core-shell structure QDs. When the content of the organic phosphine is too high, it may affect the film-forming performance of the core-shell structure nanocrystals when preparing the film layer.

In the step S03, in one embodiment, the system obtained after the completion of the shell-layer growth reaction may be mixed with an organic amine, such that the organic amine can be complexed with the shell-source cationic precursor that remains in the solution system after the completion of the shell-layer growth reaction, thereby reducing the freezing point of the shell-source cationic precursor remaining in the solution system, which is beneficial to the subsequent cleaning of the QD mixture and the improvement of the purity. Therefore, when used to prepare device film layers, the prepared QDs may effectively avoid the influence of the residual cationic precursor impurities in the core-shell structure QD solution on the device stability, and thus improve the film-forming quality of the QD solid films.

In step S03, in one embodiment, the solution system obtained after the completion of the shell-layer growth reaction may be mixed with an organic amine, and heated at a temperature condition of 80~320° C. for 10~60 minutes. Under the condition, the organic amine may be bonded to the non-metal atoms on the surface of the shell layer of the QDs to reduce the freezing point of the shell-source cationic precursor remaining in the solution system, thereby improving the purity of the core-shell structure QDs. To mix the solution system obtained after the completion of the shell-layer growth reaction and the organic amine, when the temperature is too low and/or the time is too short, the effect of the organic amine to complex the remaining cationic precursor may not be significant, and thus the purity of the core-shell structure QDs may not be improved; when the temperature is too high and/or the time is too long, the high temperature condition may affect the structural stability of the core-shell structure QDs, causing phenomena such as ligand shedding, etc.

In step S03, in the step of mixing the system obtained after the completion of the shell-layer growth reaction with the organic amine to bond the organic amine to the surface of the shell layer, in some embodiments, according to a molar-mass ratio of (5~10) mmol:10 mg between the organic amine and the initial QD cores, the core-shell structure QDs may be dispersed into a solution containing the organic amine. When the content of the organic amine is too low, the effect of improving the purity of the core-shell structure QDs may not be significant. When the content of the organic amine is too high, the remaining organic amine after complexing with the residual cationic precursor in the mixed liquid with the core-shell structure QDs may exchange with the ligands on the surface of the core-shell structure QDs. The organic amine ligands are unstable (the organic amine ligands that are exchanged may be removed during the cleaning process), and easy to fall off. Therefore, defects may be introduced to the fall-off positions and thus reduce the photo-thermal stability, fluorescence intensity, and solubility of the core-shell structure QDs.

For example, in some embodiments, the organic amine used as a post-treatment reagent may be an organic amine having 8 to 18 carbon atoms. Further, the organic amine reagent may be selected from linear organic amines containing a single amino group. The linear organic amines are beneficial to reducing steric hindrance and promoting organic amine to be bonded to the surface of the shell layer. For example, the organic amine reagent may be at least one selected from oleylamine, trioctylamine, dodecylamine, tetradecylamine, hexadecylamine, and octadecylamine.

In step S03, in one embodiment, the solution system obtained after the completion of the shell-layer growth reaction may be mixed with a mixed solution of an organic amine and an organic phosphine, so that the organic phosphine and the organic amine are bonded to the non-metal atoms on the surface of the shell layer of the QDs to increase the fluorescence intensity and purity of the core-shell structure QDs.

In step S03, in one embodiment, the solution system obtained after the completion of the shell-layer growth reaction may be mixed with a mixed solution of an organic amine and an organic phosphine, and heated at a temperature condition of 80~320° C. for 10~90 minutes. Under the condition, the organic amine and the organic phosphine may be bonded to the non-metal atoms on the surface of the shell layer of the QDs to improve the purity and fluorescence intensity of the core-shell structure QDs. To mix the solution system obtained after the completion of the shell-layer growth reaction with the mixed solution of the organic amine and the organic phosphine, when the temperature is too low and/or the time is too short, the effect of the organic amine and the organic phosphine to complex the remaining cationic precursor may not be significant, and thus the purity and fluorescence intensity of core-shell structure QDs may not be improved; when the temperature is too high and/or the time is too long, the high temperature condition may affect the structural stability of the core-shell structure QDs, causing phenomena such as ligand shedding, etc.

In step S03, in the step of mixing and heating the solution system obtained after the completion of the shell-layer growth reaction with the mixed solution of the organic amine and the organic phosphine, according to a molar-mass ratio of (5~10) mmol:10 mg between the organic amine and the initial QD cores and a molar-mass ratio of (2~5) mmol:10 mg between the organic phosphine and the initial QD cores, the solution system obtained after the completion of the shell-layer growth reaction may be mixed with the mixed solution of the organic amine and the organic phosphine. The influence of the content of the organic phosphine and the organic amine may be referred to the description provided above.

Figure 2:
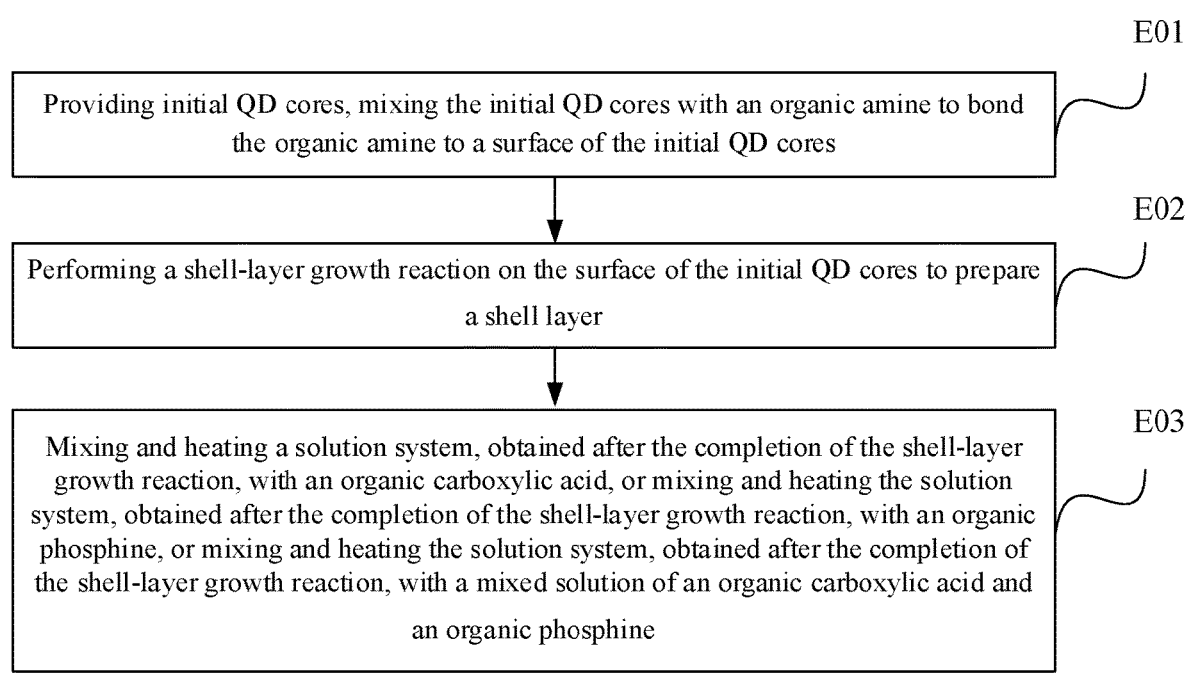
FIG. 2 illustrates a schematic flow chart of a method for preparing core-shell structure QDs provided by another embodiment of the present application.

In the second aspect, as shown in FIG. 2, the embodiments of the present application provide a method for preparing QD core-shell structure nanocrystals, including the following steps:

E01, providing initial QD cores, mixing the initial QD cores with an organic amine, so that the organic amine is bonded to the surface of the initial QD cores;

E02, performing a shell-layer growth reaction on the surface of the initial QD cores to prepare a shell layer;

E03, mixing and heating the solution system, obtained after the completion of the shell-layer growth reaction, with an organic carboxylic acid;

Or, mixing and heating the solution system, obtained after the completion of the shell-layer growth reaction, with an organic phosphine;

Or, mixing and heating the solution system, obtained after the completion of the shell-layer growth reaction, with a mixed solution of an organic carboxylic acid and an organic phosphine.

According to the method for preparing QDs provided in the examples of the present application, the initial QD cores are mixed with an organic amine, and the organic amine is bonded to the surface of the initial QD cores to fill the cationic vacancies of the initial QD cores, thereby reducing the defect states at the interface between the core and the shell, and providing a desired epitaxial interface for the growth of the shell layer. Further, because the binding force between the organic amine and the metal atoms on the surface of the QD cores is relatively weak, the organic amine requires less energy to be desorbed from the metal atoms on the surface of the previous shell layer. During the subsequent shell-growth process, the anions in the shell-source precursor are easier to be bonded to the metal ions on the surface of the cores for epitaxial growth, which may avoid the large lattice stress between the atoms at the interface between the QD cores and the shell layer, thereby reducing the presence of lattice defects on the surface of the epicrystalline shell layer. In addition, due to the dipole effect of the amino functional group of the organic amine, the shell layer is driven to grow according to the crystal orientations of the QD cores during epitaxial crystallization, such that the shell layer obtained by the shell growth is consistent with the crystal form of the QD cores, which further reduces the lattice defects between the atoms on the surface of the QD cores and the shell layer.

After the growth of the shell layer is completed, the system obtained after the completion of the shell-layer growth reaction is further mixed with at least one of an organic phosphine and/or an organic carboxylic acid for subsequent treatment. Here, when the system obtained after the completion of the shell-layer growth reaction is mixed with an organic phosphine for subsequent treatment, the organic phosphine is bonded to the non-metallic elements on the surface of the nanocrystalline shell layer to passivate the anionic vacancies, and thus reduce the defect states on the surface of the core-shell nanocrystals and further increase the fluorescence intensity of the core-shell structure QDs; when the system obtained after the completion of the shell-layer growth reaction is mixed with an organic carboxylic acid for subsequent treatment, the organic carboxylic acid can effectively eliminate the protonated organic amine connected to the surface of the core-shell structure nanocrystalline shell layer (in the process of modifying the QD cores with an organic amine, a portion of the organic amine falls off and, in the subsequent shell-growth process, binds to the surface of the growing metal atoms. Although most of the organic amine is removed during the shell-growth process, a portion of the organic amine is still bonded to the surface of the metal atoms of the shell layer without being removed from the surface; the portion of the organic amine that has not fallen off will eventually form a protonated organic amine), thereby reducing the charged organic amine ligands on the surface of the core-shell structure nanocrystals, which further reduces the excitons (electrons) generated by the core-shell structure nanocrystals when emitting light being trapped by the charged organic amine ligands on the surface. Therefore, the effect of this post-treatment is to further improve the transient fluorescence lifetime of the core-shell structure nanocrystals.

For example, in an embodiment of step E01, the initial QD cores may be at least one selected from but not limited to group II/VI QD cores, group III/V QD cores, group III/VI QD cores, and group II/III/VI QD cores. As an example, the group II/VI QD cores may be selected from but not limited to CdS, CdSe, CdTe, ZnS, ZnSe, ZnTe, HgS, HgSe, HgTe, CdZnSe, CdSSe, ZnSSe, ZnCdS, ZnCdSe, ZnSeS, ZnCdTe, ZnCdSSe, ZnCdSeS, and ZnCdTeS; the group III/V QD cores may be selected from InAs, InP, GaAs, GaP, GaSb, InSb, AlAs, AlP, AlSb, InGaAs, GaAsP and InAsP, but not limited to thereto; as an example, the group III/VI QD cores may be selected from but not limited to InS, In2S3, InSe, In2Se3, In4Se3, In2Se3, InTe, In2Se3, GaS, Ga2Se3, GaSe, Ga2Se3, GaTe, Ga2Te3; the group IUIIUVI QD cores may be selected from but not limited to CuInS, CuInZnS, and CuInSeS. In some embodiments, the initial QD cores may be selected from group II/VI QD cores.

In some embodiments, the initial QD cores are initial QD cores containing surface ligands. The surface ligand may be at least one selected from an organic carboxylic acid ligand, an organic phosphonic acid ligand, an organic phosphine ligand, and a phosphine oxide ligand. For example, the organic carboxylic acid ligand may be selected from but not limited to at least one of oleic acid, tetradecanoic acid, and dodecanoic acid; the organic phosphonic acid ligand may be selected from but not limited to at least one of octadecylphosphonic acid, tetradecylphosphonic acid, and dodecylphosphonic acid; the organic phosphine ligand may be selected from but not limited to at least one of trioctylphosphine and tributylphosphine; and the phosphine oxide ligand may be selected from but not limited to at least one of trioctylphosphine oxide and tributylphosphine oxide.

In step E01, the initial QD cores are mixed with an organic amine, and the organic amine tends to bind to the surface of the cations of the initial QD cores, such that the organic amine is bonded to the surface of the initial QD cores to fill the cationic vacancies of the initial QD cores, thereby reducing the defect states at the interface between the core and the shell, and reducing the presence of lattice defects on the surface of the epicrystalline shell layer.

In some embodiments, the organic amine may be selected from organic amines having 8 to 18 carbon atoms. In this case, the organic amine may have a relatively small steric hindrance, which facilitates the bonding of the organic amine to the surface of the initial QD cores. In some embodiments, the organic amine may be selected from linear organic amines containing a single amino group. The linear organic amines are beneficial to reducing steric hindrance and promoting the occurrence of modification. For example, the organic amine reagent may be at least one selected from oleylamine, trioctylamine, dodecylamine, tetradecylamine, hexadecylamine, and octadecylamine.

In step E01, in some embodiments, in order to facilitate the organic amine to be sufficiently and stably bonded to the surface of the initial QD cores, in the step of mixing the initial QD cores with the organic amine, the mixing conditions are as follows: the initial QD cores are mixed with the organic amine, heated at a temperature condition of 80~150° C. for 20~60 minutes to bond the organic amine to the surface of the initial QD cores.

In step E01, in some embodiments, the initial QD cores may be formulated into a solution and mixed with the organic amine. In some embodiments, in order to make the initial QD cores uniformly dispersed in the solvent (the initial QD cores are individually present in the solution and maintain a proper distance from each other), provide a desired condition for the growth of the shell layer on the surface of the QD cores, and obtain a shell layer with desired dispersion and a uniform thickness, in the initial QD core solution, the ratio of the mass of the initial QD cores to the volume of the solvent may be 10 mg:(5~15) ml.

In step E01, in some embodiments, in the step of mixing the initial QD cores with the organic amine, according to a mass-molar ratio of 10 mg:(3~10) mmol between the QD cores and the organic amine, the initial QD cores may be dispersed into a solution containing the organic amine for surface modification of the initial QD cores. In order to ensure that the organic amine is fully bonded to the initial QD cores and reduce the defect states on the surface of the initial QD cores, the organic amine may have a certain amount of excess. However, the excessive amount of the organic amine may not be too much, otherwise the viscosity may be too large, which may affect the subsequent shell-layer growth rate, and may be detrimental to the formation of the shell layer.

In step E02 described above, the shell-layer growth reaction may be performed on the surface of the initial QD cores for the preparation of the shell layer. In one embodiment of the present application, the shell-source precursor may be injected once into the solution containing the initial QD cores for the growth of a shell layer. In another embodiment of the present application, the shell-source precursor may be injected multiple times into the solution containing the initial QD cores or the shell-growth solution system for the growth of multiple shell layers. For example, a shell-source precursor may be added to the initial QD cores for a first shell growth to prepare a first shell layer; further, on the basis of the first shell layer, a shell-source precursor may be added for a second shell growth to prepare a second shell layer on the surface of the first shell layer; and in this way, after N times of shell growth, an $N^{th}$ shell layer may be prepared. In this embodiment, the surface of each shell layer is combined with the organic carboxylic acid in the shell-growth reaction system and the organic ligands after the pyrolysis of the shell-source anionic precursor and the shell-source cationic precursor, such that after preparing and obtaining each shell layer, the material may have desired monodispersity, which may be conducive to the subsequent growth of the shell layer or having desired dispersion performance as a product application.

In the embodiments of the present application, the shell-source precursor may include a shell-source cationic precursor and a shell-source anionic precursor. Here, the shell-source cationic precursor may be at least one of organic metal carboxylates formed from oxides or metal salts of metals, such as Cd, Zn, Pb, Ag, Hg, Fe, In, Al, etc., and an organic carboxylic acid. Further, the shell-source cationic precursor may be at least one selected from zinc oleate, lead oleate, silver oleate, mercury oleate, indium oleate, copper oleate, iron oleate, manganese oleate, aluminum oleate, zinc stearate, lead stearate, silver stearate, mercury stearate, indium stearate, copper stearate, iron stearate, manganese stearate, aluminum stearate, zinc tetradecanoate, lead tetradecanoate, silver tetradecanoate, mercury tetradecanoate, indium tetradecanoate, copper tetradecanoate, iron tetradecanoate, manganese tetradecanoate, aluminum tetradecanoate, zinc hexadecanoate, lead hexadecanoate, silver hexadecanoate, mercury hexadecanoate, indium hexadecanoate, copper hexadecanoate, iron hexadecanoate, manganese hexadecanoate, aluminum hexadecanoate, zinc dodecanoate, lead dodecanoate, silver dodecanoate, mercury dodecanoate, indium dodecanoate, copper dodecanoate, iron dodecanoate, manganese dodecanoate, aluminum dodecanoate, zinc octadecanoate, lead octadecanoate, silver octadecanoate, mercury octadecanoate, indium octadecanoate, copper octadecanoate, iron octadecanoate, manganese octadecanoate, and aluminum octadecanoate, but not limited thereto. In the embodiments of the present application, after dispersing non-metallic elements such as Te, Se, S, P, etc. into organic molecules to form an anionic complex, the shell-source anionic precursor may be prepared. When the shell-source anionic precursor is an anionic complex formed by non-metallic elements such as Te, Se, S, P, etc. and organic molecules, the organic molecules may be at least one selected from trioctylphosphine, tributylphosphine, oleic acid, and octadecene, but not limited thereto. In the embodiments of the present application, when the anionic precursor is a mercaptan, the organic molecule of the non-metal atom may be an organic molecule containing a single functional group, e.g., the thiol (—HS) functional group (such as octadecanethiol, heptadecanethiol, hexadecanethiol, pentadecanethiol, tetradecanethiol, tridecanethiol, dodecanethiol, octanethiol, etc. but not limited to thereto).

In the embodiments of the present application, the selection of the shell source is not limited. In some embodiments, the band gap of the obtained shell layer may be greater than the band gap of the initial QD cores.

In some embodiments of the present application, the shell-source cationic precursor may be at least one selected from organometallic carboxylates of Cd, Zn, and Pb, and the shell-source anionic precursor may be selected from anionic complexes or thiols formed by dispersing the elements of Te, Se and S into organic molecules.

In the embodiments of the present application, each time the shell source is injected for shell growth, the order of adding the shell-source cationic precursor and the shell-source anionic precursor is not strictly limited. For example, the shell source is a mixed precursor solution in which a shell-source cationic precursor and a shell-source anionic precursor are dispersed; the method of adding the shell source may include: injecting the cationic precursor and the anionic precursor into solvents to respectively prepare a cationic precursor solution and an anionic precursor solution, and injecting the shell-source cationic precursor solution first and then injecting the shell-source anionic precursor solution; or, injecting the cationic precursor and the anionic precursor into solvents to respectively prepare a cationic precursor solution and an anionic precursor solution, and injecting the shell-source anionic precursor solution first and then injecting the shell-source cationic precursor solution; or, injecting the cationic precursor and the anionic precursor into a solvent to prepare a mixed solution containing the cationic precursor and the anionic precursor, and injecting the mixed solution into the solution containing the initial QD cores or the shell-growth solution system.

In some embodiments, the concentration range of the shell-source cationic precursor solution may be (0.5~1.5) mmol/ml; the concentration range of the shell-source anionic precursor solution may be (0.5~1.5) mmol/ml. Proper concentrations may be conducive to the uniform bonding of shell-source cationic precursor and shell-source anionic precursor on the surface of the initial QD cores to form a uniform and stable shell layer through crystallization.

In some embodiments, according to a mass ratio of (1~1.5) mmol:10 mg between the shell-source cationic precursor and the initial QD cores, and/or a mass ratio of (1 1.5) mmol:10 mg between the shell-source anionic precursor and the initial QD cores, the shell-source precursors may be injected into the solution containing the initial QD cores or the shell-growth solution system. The method is conducive to uniform and stable bonding of the anionic precursor and the cationic precursor on the surface of the initial QD cores, and obtaining a shell layer with an appropriate thickness.

In some embodiments, the temperature for preparing the shell layer on the surface of the initial QD cores after the modification treatment may be 150~320° C. The temperature range is conducive to crystallization of the anionic and cationic precursors into shells, and does not affect the stability of the QDs.

In step E03, in one embodiment, the solution system obtained after the completion of the shell-layer growth reaction may be mixed with an organic phosphine, such that the organic phosphine may be bonded to the non-metal atoms on the surface of the shell layer of the QDs to reduce the defect states on the surface of the core-shell nanocrystals and further increase the fluorescence intensity of the core-shell structure QDs.

In step E03, in one embodiment, the solution system obtained after the completion of the shell-layer growth reaction may be mixed with an organic phosphine, and heated at a temperature condition of 100~320° C. for 10~60 minutes. Under the condition, the organic phosphine may be bonded to the non-metal atoms on the surface of the shell layer of the QDs to reduce the defect states on the surface of the core-shell nanocrystals and further increase the fluorescence intensity of the core-shell structure QDs. To mix the organic phosphine with the solution system obtained after the completion of the shell-layer growth reaction, when the treatment temperature is too low and/or the time is too short, the organic phosphine may not have a significant effect on passivating the anionic vacancies, and may even not play any passivating role at all, and thus may not be able to increase the fluorescence intensity of the core-shell structure nanocrystals; To mix the organic phosphine with the solution system obtained after the completion of the shell-layer growth reaction, when the treatment temperature is too high, not only the organic phosphine may be easily volatilized, thereby affecting the modification treatment effect, but high temperature condition may affect the structural stability of the core-shell nanocrystals.

In step E03, in the step of mixing and heating the system obtained after the completion of the shell-layer growth reaction with the organic phosphine, in some embodiments, according to a molar-mass ratio of (2~5) mmol:10 mg between the organic phosphine and the initial QD cores, the core-shell structure QDs may be dispersed into a solution containing the organic phosphine. When the content of the organic phosphine is too low, the effect of passivating anionic vacancies may not be significant, and thus it may be difficult to significantly increase the fluorescence intensity of the core-shell structure QDs. When the content of the organic phosphine is too high, it may affect the film-forming performance of the core-shell structure nanocrystals when preparing the film layer.

In step E03, in one embodiment, the system obtained after the completion of the shell-layer growth reaction may be mixed with an organic carboxylic acid, such that the organic carboxylic acid may be complexed with the shell-source cationic precursor that remains in the solution system after the completion of the shell-layer growth reaction, thereby eliminating the protonated organic amine on the surface of the shell layer of the core-shell structure nanocrystals, and improving the transient fluorescence lifetime of the core-shell structure nanocrystals.

In step E03, in one embodiment, the solution system obtained after the completion of the shell-layer growth reaction may be mixed with an organic carboxylic acid, and heated at a temperature condition of 240~320° C. for 30~90 minutes. Under the condition, the organic carboxylic acid may be bonded to the non-metal atoms on the surface of the shell layer of the QDs to improve the transient fluorescence lifetime of the core-shell structure nanocrystals. To mix the solution system obtained after the completion of the shell-layer growth reaction with the organic carboxylic acid, when the temperature is too low and/or the time is too short, the effect of the organic carboxylic acid to complex the remaining cationic precursor may not be significant, and thus the transient fluorescence lifetime of the core-shell structure nanocrystals may not be improved; when the temperature is too high and/or the time is too long, the high temperature condition may affect the structural stability of the core-shell structure QDs, causing phenomena such as ligand shedding, etc.

In step E03, in the step of mixing the system obtained after the completion of the shell-layer growth reaction with the organic carboxylic acid to bond the organic carboxylic acid to the surface of the shell layer, in some embodiments, according to a molar-mass ratio of (5~10) mmol:10 mg between the organic carboxylic acid and the initial QD cores, the core-shell structure QDs may be dispersed into a solution containing the organic carboxylic acid. When the content of the organic carboxylic acid is too low, the effect of eliminating protonated organic amine bonded to the surface of the shell layer of the core-shell nanocrystals may not be significant, making it difficult to significantly improve the transient fluorescence lifetime of the nanocrystals. When the content of the organic carboxylic acid is too high, in a case where the obtained QDs are used as a device functional layer such as a QD light-emitting layer, the film-forming performance of the film layer may be degraded, which further affects the light-emitting performance of the device.

In some embodiments, the organic acid may be selected from organic acids having 8 to 18 carbon atoms. In some examples, the organic acid reagent may be selected from linear organic acids containing a single carboxylic group. The linear amines are beneficial to reducing steric hindrance and promoting the occurrence of complexation. For example, the organic acid reagent may be at least one selected from oleic acid, dodecanoic acid, tetradecanoic acid, hexadecanoic acid, and octadecanoic acid.

In step E03, in one embodiment, the solution system obtained after the completion of the shell-layer growth reaction may be mixed with a mixed solution of an organic carboxylic acid and an organic phosphine, such that the organic phosphine and the organic carboxylic acid may be bonded to the non-metal atoms on the surface of the shell layer of the QDs. The organic phosphine may be coordinately bonded to the non-metal atoms on the surface of the shell layer of the nanocrystals to further passivate the anionic vacancies, thereby reducing the defect states on the surface of the core-shell structure nanocrystals and improving the fluorescence intensity of the core-shell structure nanocrystals. When the organic acid post-processes the core-shell structure nanocrystals, the protonated organic amines bonded to the surface of the shell layer of the core-shell structure nanocrystals may be effectively eliminated, thereby improving the transient fluorescence lifetime of the nanocrystals. At the same time, the organic acid and the organic phosphine may form interlaced ligands on the surface of the core-shell structure nanocrystals and maybe bonded to the metal and non-metal atoms on the surface of the nanocrystals. The interlaced ligands may further improve the solubility and the stability of the nanocrystals. In addition, when the solution system obtained after the completion of the shell-layer growth reaction is mixed with a mixed solution of an organic carboxylic acid and an organic phosphine, the organic carboxylic acid may promote the decomposition of a part of the shell that is unstable in crystallization on the surface of the core-shell QDs. The metal atoms obtained after the decomposition and the organic carboxylic acid may again form a metal cationic precursor, and the anions obtained after the decomposition and the organic phosphine may again form an anionic precursor. Further, the re-formed anionic and cationic precursors in the post-processing process may undergo shell-layer growth again on the surface of the core-shell QDs. When the re-formed shell layer grows, the core-shell QDs with small particles may preferentially grow again due to the relatively large body surface and the fast growth rate, and thus the final effect is that the size of the core-shell QDs may be relatively uniform.

In step E03, in one embodiment, the solution system obtained after the completion of the shell-layer growth reaction may be mixed with a mixed solution of an organic carboxylic acid and an organic phosphine, and heated at a temperature condition of 100~320° C. for 10~60 minutes. Under the condition, the organic carboxylic acid and the organic phosphine may be bonded to the non-metal atoms on the surface of the shell layer of the QDs to improve the transient fluorescence lifetime and the fluorescence intensity of the core-shell structure QDs. To mix the solution system obtained after the completion of the shell-layer growth reaction with the mixed solution of the organic carboxylic acid and the organic phosphine, when the temperature is too low and/or the time is too short, the effect of the organic carboxylic acid and the organic phosphine to complex the remaining cationic precursor may not be significant, and thus the transient fluorescence lifetime and the fluorescence intensity of core-shell structure QDs may not be improved; when the temperature is too high and/or the time is too long, the high temperature condition may affect the structural stability of the core-shell structure QDs, causing phenomena such as ligand shedding, etc.

In step E03, in the step of mixing and heating the solution system obtained after the completion of the shell-layer growth reaction with the mixed solution of the organic carboxylic acid and the organic phosphine, according to a molar-mass ratio of (5~10) mmol:10 mg between the organic carboxylic acid and the initial QD cores and a molar-mass ratio of (2~5) mmol:10 mg between the organic phosphine and the initial QD cores, the solution system obtained after the completion of the shell-layer growth reaction may be mixed with the mixed solution of the organic carboxylic acid and the organic phosphine. The influence of the content of the organic phosphine and the organic carboxylic acid may be referred to the description provided above.

The embodiments of the present application also provide a core-shell structure QD prepared by the above method.

In the embodiments of the present application, applications of the core-shell structure QDs in the fields of optical devices, optical films, core-shell structure QD inks, glue, biological probes, etc. are provided.

In some embodiments, the optical device may include, but are not limited to, QD light-emitting diode (LED), and QD sensitized battery.

In some embodiments, the optical film may include, but is not limited to, QD light-emitting barrier film, QD light-emitting tube, etc.

In some embodiments, the core-shell structure QD ink may include, but is not limited to, an ink formed by combining QDs with other different chemical solvents in different ratios.

In some embodiments, the glue may include, but is not limited to, glue composed of core-shell structure QDs and other different chemical reagents according to different viscosity ratios.

In some embodiments, the biological probe may be made of QDs modified with specific substances.

The following is a description with reference to specific embodiments.

Embodiment 1

A preparation method for QDs includes the following steps:
1. Preparing cadmium selenide (CdSe) initial QD cores,
   11) Preparing a cadmium precursor: adding 0.25 mmol of CdO, 0.5 mmol of octadecylphosphonic acid, and 3 g of trioctylphosphine oxide together in a 50 ml three-necked flask, dissolving the mixture by heating to 380° C., the mixture becoming a clear and transparent solution, and keeping the mixture at this temperature;
   12) Preparing of a Se precursor: taking and stirring 0.5 mmol of a Se source solution and 1 ml of trioctylphosphine at room temperature until the mixture becomes clear, keeping the mixture for later use;
   13) Preparing CdSe initial QDs: prior to injecting the Se precursor, injecting 1 ml of a trioctylphosphine solution into 11), and when the temperature of the solution returns to 380° C., injecting the Se precursor for 30 seconds, and then injecting 10 ml of octadecene to quench the reaction and cool to room temperature before cleaning;
   14) Cleaning and purifying CdSe initial QDs: adding 30 ml of acetone to the QD mixture to centrifuge the QDs, and dispersing the centrifuged CdSe initial QDs in 10 ml of n-hexane for later use.
2. Treating cadmium selenide (CdSe) initial QD cores,
   Taking 2 ml of the solution prepared in step 1) with CdSe initial QDs dispersed in n-hexane, adding it to a solution containing 1 ml of oleic acid and 10 ml of octadecene, heating the mixture to 150° C. and venting for 20 minutes, and then raising the temperature of the CdSe solution to 300° C.
3. Preparing CdSe/ZnS core-shell QDs,
   31) Preparaing a ZnS shell source: taking and dispersing 1 mmol of zinc oleate precursor and 1.5 mmol of 1-octadecanethiol together in 10 ml of octadecene solution, stirring and heating at 80° C. to make the turbid liquid clear, and then cooling to room temperature for later use;
   32) Growing a ZnS shell layer: injecting the ZnS shell source prepared in step 31) into the CdSe initial QD core solution prepared in step 2) at a dropping rate of 6 ml/h for shell-layer growth, where the injection time is 80 minutes;
   33) After the cyclic reaction is completed, cooling the prepared CdSe/ZnS QD solution to room temperature without any post-treatment.
4. Purifying the CdSe/ZnS core-shell QDs.
   Adding an appropriate amount of ethyl acetate and ethanol to the QD mixture prepared in step 3) to centrifuge the CdSe/ZnS QD solution, dispersing the centrifuged CdSe/ZnS QD solution again in an appropriate amount of chloroform solution, adding acetone and methanol to the solution for precipitation and centrifugal separation, and repeating this step once; and then vacuum drying the resulting CdSe/ZnS QDs.

The solubility of the CdSe/ZnS QDs prepared according to the method of this embodiment is improved, and the corresponding effect is that the monodispersity of CdSe/ZnS core-shell QDs can be improved; the absorbance of the CdSe/ZnS solution (a concentration of 0.05 mg/ml) is tested by a UV-visible fluorescence spectrometer, where the absorbance value ranges from 0.86 to 1.53.

Embodiment 2

A preparation method for core-shell structure QDs includes the following steps:
1. Preparing CdS initial QD cores,
   11) Preparing a {Cd(OA)$_2$} precursor,
   Adding 1 mmol of CdO, 4 mmol of oleic acid (OA), and 10 ml of octadecene (ODE) in a three-necked flask, evacuating at room temperature for 30 minutes first, heating to 180° C. for 60 minutes for argon evacuation, maintaining at 180° C. and evacuating for 30 minutes, and then cooling to room temperature for later use;
   12) Preparing a selenium (Se) precursor: weighing 10 mmol of Se and adding it into 10 ml of trioctylphosphine oxide (TOP), heating to 170° C. for 30 minutes, and then lowering the temperature to 140° C.;
   13) Preparing a sulfur (S-TOP) precursor: weighing 20 mmol of S and adding it into 10 ml of trioctylphosphine oxide (TOP), heating to 170° C. for 30 minutes, and then lowering the temperature to 140° C.;
   14) Preparing a sulfur (S-ODE) precursor: weighing 5 mmol of S and adding it into 10 ml of octadecene (ODE), heating to 110° C. for 60 minutes, and then keeping the temperature at 110° C.;
   15) Heating the cadmium oleate {Cd(OA)$_2$} precursor prepared in step 11) to 250° C., extracting 2 ml of S-ODE precursor prepared in step 14) into a three-necked flask and reacting for 10 minutes to prepare the CdS initial QD cores, dispersing the prepared CdS initial QD cores in n-hexane through centrifugal drying.

2. Preparing CdS/CdSe core-shell QDs as follows:
21) Preparing a CdSe shell source: taking 1 mmol of cadmium oleate precursor and 1.5 mmol of Se-TOP and dispersing them in 10 ml of octadecene solution, and then stirring for later use.
22) Taking and dispersing 10 mg of CdS initial QD cores in 1 ml of OA and 10 ml of ODE, venting at room temperature for 20 minutes, and then heating to 300° C.,
23) Growing a CdS shell layer: dropping the CdS shell source prepared in step 21) into the CdSe initial QD core solution prepared in step 1) at a dropping rate of 6 ml/h for shell-layer growth, where the injection time is 80 minutes,
24) Adding a precipitant to the CdS/CdSe core-shell QD mixture prepared in step 23), and centrifuging to separate the prepared CdS/CdSe core-shell QDs in n-hexane.

3. Preparing oil-soluble red CdS/CdSe/CdS as follows:
31) Preparing a CdS shell source: taking and dispersing 1 mmol of cadmium oleate precursor and 1.5 mmol of 1-dodecanethiol together in 10 ml of octadecene solution, stirring and heating at 80° C. to make the turbid liquid clear, and then cooling to room temperature for later use;
32) Taking and dispersing 10 mg of CdS/CdSe shell-core structure QDs in 1 ml of OA and 10 ml of ODE, venting at room temperature for 20 minutes, and then heating to 300° C.,
33) Growing a CdS shell layer: dropping the CdS shell source prepared in step 31) into the CdS/CdSe shell-core structure QD solution prepared in step 2) at a dropping rate of 6 ml/h for shell-layer growth, where the injection time is 80 minutes.
34) After the cyclic reaction is completed, cooling the prepared CdS/CdSe/CdS QD solution to room temperature without any post-treatment.

4. Purifying the oil-soluble red CdS/CdSe/CdS.
41) Adding an appropriate amount of ethyl acetate and ethanol to the QD mixture prepared in step 3) to centrifuge the CdS/CdSe/CdS QD solution, dispersing the centrifuged CdS/CdSe/CdS QD solution again in an appropriate amount of chloroform solution, adding acetone and methanol to the solution for precipitation and centrifugal separation, and repeating this step once; and then vacuum drying the resulting CdS/CdSe/CdS QDs.

The solubility of the CdS/CdSe/CdS QDs prepared according to the method of this embodiment is improved, and the corresponding effect is that the monodispersity of CdS/CdSe/CdS core-shell QDs can be improved; the absorbance of the CdS/CdSe/CdS solution (a concentration of 0.05 mg/ml) is tested by a UV-visible fluorescence spectrometer, where the absorbance value ranges from 0.85 to 1.62.

Embodiment 3

A preparation method for core-shell structure QDs includes the following steps:
1. Preparing cadmium selenide (CdSe) initial QD cores,
11) Preparing a cadmium precursor: adding 0.25 mmol of CdO, 0.5 mmol of octadecylphosphonic acid, and 3 g of trioctylphosphine oxide together in a 50 ml three-necked flask, dissolving the mixture by heating to 380° C., the mixture becoming a clear and transparent solution, and keeping the mixture at this temperature;
12) Preparing of a Se precursor: taking and stirring 0.5 mmol of a Se source solution and 1 ml of trioctylphosphine at room temperature until the mixture becomes clear, keeping the mixture for later use;
13) Preparing CdSe QDs: prior to injecting the Se precursor prepared in step 12), injecting 1 ml of a trioctylphosphine solution into the solution prepared in step 11), and when the temperature of the solution returns to 380° C., injecting the Se precursor for 30 seconds, and then injecting 10 ml of octadecene to quench the reaction and cool to room temperature before cleaning;
14) Cleaning and purifying CdSe initial QDs: adding 30 ml of acetone to the QD mixture to centrifuge the QDs, and dispersing the centrifuged CdSe initial QDs in 10 ml of n-hexane for later use.

2. Treating cadmium selenide (CdSe) initial QD cores,
Dispersing CdSe initial QD cores: Taking 2 ml of the solution prepared in step 1) with CdSe initial QDs dispersed in n-hexane, adding it to a solution containing 1 ml of oleic acid and 10 ml of octadecene, heating the CdSe initial QD solution to 150° C. and venting for 20 minutes to remove the excessive n-hexane, and then raising the temperature of the CdSe solution to 300° C.

3. Preparing CdSe/CdS core-shell QDs,
31) Preparing a CdS shell source: taking and dispersing 1 mmol of cadmium oleate precursor and 1.5 mmol of 1-dodecanethiol together in 10 ml of octadecene solution, stirring and heating at 80° C. to make the turbid liquid clear, and then cooling to room temperature for later use;
32) Growing a CdS shell layer: dropping the CdS shell source prepared in step 31) into the CdSe initial QD core solution prepared in step 2) at a dropping rate of 6 ml/h for shell-layer growth, where the injection time is 80 minutes;
33) After the cyclic shell-layer growth is completed, adding 5 mmol of oleylamine to the mixture, and performing an aging treatment at 300° C. for 60 minutes;
34) After the cyclic reaction is completed, cooling the prepared CdSe/CdS QD solution to room temperature without any post-treatment.

4. Purifying CdSe/CdS core-shell QDs,
41) Adding an appropriate amount of ethyl acetate and ethanol to the QD mixture prepared in step 3) to centrifuge the CdSe/CdS QD solution, dispersing the centrifuged CdSe/CdS QD solution again in an appropriate amount of chloroform solution, adding acetone and methanol to the solution for precipitation and centrifugal separation, and repeating this step once; and then vacuum drying the resulting CdSe/CdS QDs.

The fluorescence intensity of the CdSe/CdS QDs prepared according to the method of this example is somewhat reduced, but the stability after being prepared as a device is improved. The quantum yield (QY) of the CdSe/CdS solution at room temperature is tested by the integrating sphere of a fluorescence spectrometer (Edinburgh-FS5), where the QY value ranges from 70% to 79%; the external quantum efficiency (EQE) of the QLED device is reduced by 1%~5% after 30 days of testing.

Embodiment 4

A preparation method for core-shell structure QDs includes the following steps:
1. Preparing cadmium selenide (CdSe) initial QD cores,
   11) Preparing a cadmium precursor: adding 0.25 mmol of CdO, 0.5 mmol of octadecylphosphonic acid, and 3 g of trioctylphosphine oxide together in a 50 ml three-necked flask, dissolving the mixture by heating to 380° C., the mixture becoming a clear and transparent solution, and keeping the mixture at this temperature;
   12) Preparing of a Se precursor: taking and stirring 0.5 mmol of a Se source solution and 1 ml of trioctylphosphine at room temperature until the mixture becomes clear, keeping the mixture for later use;
   13) Preparing CdSe QDs: prior to injecting the Se precursor prepared in step 12), injecting 1 ml of a trioctylphosphine solution into the solution prepared in step 11), and when the temperature of the solution returns to 380° C., injecting the Se precursor for 30 seconds, and then injecting 10 ml of octadecene to quench the reaction and cool to room temperature before cleaning;
   14) Cleaning and purifying CdSe initial QDs: adding 30 ml of acetone to the QD mixture to centrifuge the QDs, and dispersing the centrifuged CdSe initial QDs in 10 ml of n-hexane for later use.
2. Treating cadmium selenide (CdSe) initial QD cores,
Dispersing CdSe initial QD cores: Taking 2 ml of the solution prepared in step 1) with CdSe initial QDs dispersed in n-hexane, adding it to a solution containing 1 ml of oleic acid and 10 ml of octadecene, heating the CdSe initial QD solution to 150° C. and venting for 20 minutes to remove the excessive n-hexane, and then raising the temperature of the CdSe solution to 300° C.
3. Preparing CdSe/CdS core-shell QDs,
   31) Preparing a CdS shell source: taking and dispersing 1 mmol of cadmium oleate precursor and 1.5 mmol of 1-dodecanethiol together in 10 ml of octadecene solution, stirring and heating at 80° C. to make the turbid liquid clear, and then cooling to room temperature for later use;
   32) Growing a CdS shell layer: dropping the CdS shell source prepared in step 31) into the CdSe initial QD core solution prepared in step 2) at a dropping rate of 6 ml/h for shell-layer growth, where the injection time is 80 minutes.
   33) After the cyclic shell-layer growth is completed, adding 5 mmol of trioctylphosphine to the mixture, and performing an aging treatment at 300° C. for 60 minutes;
   34) After the cyclic reaction is completed, cooling the prepared CdSe/CdS QD solution to room temperature without any post-treatment.
4. Purifying CdSe/CdS core-shell QDs,
Adding an appropriate amount of ethyl acetate and ethanol to the QD mixture prepared in step 3) to centrifuge the CdSe/CdS QD solution, dispersing the centrifuged CdSe/CdS QD solution again in an appropriate amount of chloroform solution, adding acetone and methanol to the solution for precipitation and centrifugal separation, and repeating this step once; and then vacuum drying the resulting CdSe/CdS QDs.

The CdSe/CdS QDs prepared according to the method of this example can further improve the fluorescence intensity of the QDs. The quantum yield (QY) of the CdSe/CdS solution at room temperature is tested by the integrating sphere of a fluorescence spectrometer (Edinburgh-FS5), where the QY value ranges from 78% to 89%.

Embodiment 5

A preparation method for core-shell structure QDs includes the following steps:
1. Preparing cadmium selenide (CdSe) initial QD cores,
   11) Preparing a cadmium precursor: adding 0.25 mmol of CdO, 0.5 mmol of octadecylphosphonic acid, and 3 g of trioctylphosphine oxide together in a 50 ml three-necked flask, dissolving the mixture by heating to 380° C., the mixture becoming a clear and transparent solution, and keeping the mixture at this temperature;
   12) Preparing of a Se precursor: taking and stirring 0.5 mmol of a Se source solution and 1 ml of trioctylphosphine at room temperature until the mixture becomes clear, keeping the mixture for later use;
   13) Preparing CdSe QDs: prior to injecting the Se precursor prepared in step 12), injecting 1 ml of a trioctylphosphine solution into the solution prepared in step 11), and when the temperature of the solution returns to 380° C., injecting the Se precursor for 30 seconds, and then injecting 10 ml of octadecene to quench the reaction and cool to room temperature before cleaning;
   14) Cleaning and purifying CdSe QDs: adding 30 ml of acetone to the QD mixture to centrifuge the QDs, and dispersing the centrifuged CdSe QDs in 10 ml of n-hexane for later use.
2. Treating cadmium selenide (CdSe) initial QD cores,
Dispersing CdSe initial QD cores: Taking 2 ml of the solution prepared in step 1) with CdSe initial QDs dispersed in n-hexane, adding it to a solution containing 1 ml of oleic acid and 10 ml of octadecene, heating the CdSe initial QD solution to 150° C. and venting for 20 minutes to remove the excessive n-hexane, and then raising the temperature of the CdSe solution to 300° C.
3. Preparing CdSe/CdS core-shell QDs,
   31) Preparing a CdS shell source: taking and dispersing 1 mmol of cadmium oleate precursor and 1.5 mmol of 1-octadecanethiol together in 10 ml of octadecene solution, stirring and heating at 80° C. to make the turbid liquid clear, and then cooling to room temperature for later use;
   32) Growing a CdS shell layer: dropping the CdS shell source prepared in step 31) into the CdSe initial QD core solution prepared in step 2) at a dropping rate of 6 ml/h for shell-layer growth, where the injection time is 80 minutes;
   33) After the cyclic shell-layer growth is completed, adding a mixture of 1 ml of oleylamine and 2 mmol of tributylphosphine to the mixture, and performing an aging treatment at 300° C. for 60 minutes;
   34) After the cyclic reaction is completed, cooling the prepared CdSe/CdS initial QD solution to room temperature without any post-treatment.
4. Purifying CdSe/CdS core-shell QDs,
Adding an appropriate amount of ethyl acetate and ethanol to the QD mixture prepared in step 3) to centrifuge the CdSe/CdS QD solution, dispersing the centrifuged CdSe/CdS QD solution again in an appropriate amount of chloroform solution, adding acetone and methanol to the solution for precipitation and centrifugal separation, and repeating this step once; and then vacuum drying the resulting CdSe/CdS QDs.

The CdSe/CdS QDs prepared according to the method of this example can improve the stability. The quantum yield (QY) of the solution at room temperature is tested after 30 days by the integrating sphere of a fluorescence spectrometer (Edinburgh-FS5), where the QY value ranged from 83 to 91%.

Embodiment 6

A preparation method for core-shell structure nanocrystals including the following steps:
1. Preparing cadmium selenide (CdSe) initial QD cores,
   11) Preparing a cadmium precursor: adding 0.25 mmol of CdO, 0.5 mmol of octadecylphosphonic acid, and 3 g of trioctylphosphine oxide together in a 50 ml three-necked flask, dissolving the mixture by heating to 380° C., the mixture becoming a clear and transparent solution, and keeping the mixture at this temperature;
   12) Preparing of a Se precursor: taking and stirring 0.5 mmol of a Se source solution and 1 ml of trioctylphosphine at room temperature until the mixture becomes clear, keeping the mixture for later use;
   13) Preparing CdSe QDs: injecting 1 ml of a trioctylphosphine solution into the solution prepared in step 11), and when the temperature of the solution returns to 380° C., injecting the Se precursor prepared in step 12) for 30 seconds, and then injecting 10 ml of octadecene to quench the reaction and cool to room temperature before cleaning;
   14) Cleaning and purifying CdSe initial QDs: adding 30 ml of acetone to the initial QD mixture to centrifuge the QDs, and dispersing the centrifuged CdSe initial QDs in 10 ml of n-hexane for later use.
2. Treating cadmium selenide (CdSe) initial QD cores,
   Dispersing CdSe initial QD cores: Taking 2 ml of the solution prepared in step 1) with CdSe initial QDs dispersed in n-hexane, adding it to a solution containing 1 ml of oleylamine and 10 ml of octadecene, heating the CdSe initial QD solution to 150° C. and venting for 20 minutes to remove the excessive n-hexane, and then raising the temperature of the CdSe solution to 300° C.
3. Preparing CdSe/ZnS core-shell QDs,
   31) Preparaing a ZnS shell source: taking and dispersing 1 mmol of zinc oleate precursor and 1.5 mmol of 1-octadecanethiol together in 10 ml of octadecene solution, stirring and heating at 80° C. to make the turbid liquid clear, and then cooling to room temperature for later use;
   32) Growing a ZnS shell layer: injecting the ZnS shell source prepared in step 31) into the CdSe initial QD core solution prepared in step 2) at a dropping rate of 6 ml/h for shell-layer growth, where the injection time is 80 minutes;
   33) After the cyclic reaction is completed, cooling the prepared CdSe/ZnS QD solution to room temperature without any post-treatment.
4. Purifying the CdSe/ZnS core-shell QDs.
   Adding an appropriate amount of ethyl acetate and ethanol to the QD mixture prepared in step 3) to centrifuge the CdSe/ZnS QD solution, dispersing the centrifuged CdSe/ZnS QD solution again in an appropriate amount of chloroform solution, adding acetone and methanol to the solution for precipitation and centrifugal separation, and repeating this step once; and then vacuum drying the resulting CdSe/ZnS QDs.

The CdSe/ZnS QDs prepared according to the method of this example can reduce the generation of shell-layer defects, and the corresponding effect is that the fluorescence intensity of CdSe/ZnS core-shell QDs can be improved. The quantum yield (QY) of the solution at room temperature is tested by the integrating sphere of a fluorescence spectrometer (Edinburgh-FS5), where the QY value ranges from 78% to 83%.

Embodiment 7

A preparation method for core-shell structure nanocrystals including the following steps:
1. Preparing CdSe initial QDs as the following:
   11) Preparing a {Cd(OA)$_2$} precursor,
   Adding 1 mmol of CdO, 4 mmol of oleic acid (OA), and 10 ml of octadecene (ODE) in a three-necked flask, evacuating at room temperature for 30 minutes first, heating to 180° C. for 60 minutes for argon evacuation, maintaining at 180° C. and evacuating for 30 minutes, and then cooling to room temperature for later use;
   12) Preparing a selenium (Se) precursor,
   Weighing 10 mmol of Se and adding it into 10 ml of trioctylphosphine oxide (TOP), heating to 170° C. for 30 minutes, and then lowering the temperature to 140° C.;
   13) Preparing a sulfur (S-TOP) precursor,
   Weighing 20 mmol of S and adding it into 10 ml of trioctylphosphine oxide (TOP), heating to 170° C. for 30 minutes, and then lowering the temperature to 140° C.;
   14) Preparing a sulfur (S-ODE) precursor,
   Weighing 5 mmol of S and adding it into 10 ml of octadecene (ODE), heating to 110° C. for 60 minutes, and then keeping the temperature at 110° C.;
   15) Heating the cadmium oleate {Cd(OA)$_2$} precursor prepared in step 11) to 250° C., extracting 2 ml of S-ODE precursor prepared in step 14) into a three-necked flask and reacting for 10 minutes to prepare the CdS initial QD cores, dispersing the prepared CdS initial QD cores in n-hexane through centrifugal drying.
2. Preparing CdS/CdSe core-shell QDs as follows:
   21) Preparing a CdSe shell source: taking 1 mmol of cadmium oleate precursor and 1.5 mmol of Se-TOP and dispersing them in 10 ml of octadecene solution, and then stirring for later use.
   22) Taking and dispersing 10 mg of CdS initial QD cores in 1 ml of OA and 10 ml of ODE, venting at room temperature for 20 minutes, and then heating to 300° C.,
   23) Growing a CdS shell layer: dropping the CdS shell source prepared in step 21) into the CdSe initial QD core solution prepared in step 1) at a dropping rate of 6 ml/h for shell-layer growth, where the injection time is 80 minutes,
   24) Adding a precipitant to the CdS/CdSe core-shell QD mixture prepared in step 23), and centrifuging to separate the prepared CdS/CdSe core-shell QDs in n-hexane.
3. Preparing CdS/CdSe/CdS shell-core QDs as follows:
   31) Preparing a CdS shell source: taking and dispersing 1 mmol of cadmium oleate precursor and 1.5 mmol of 1-dodecanethiol together in 10 ml of octadecene solution, stirring and heating at 80° C. to make the turbid liquid clear, and then cooling to room temperature for later use;
   32) Taking and dispersing 10 mg of CdS/CdSe shell-core structure QDs in 1 ml of OA and 10 ml of ODE, venting at room temperature for 20 minutes, and then heating to 300° C.,
   33) Growing a CdS shell layer: dropping the CdS shell source prepared in step 31) into the CdS/CdSe QD solution prepared in step 2) at a dropping rate of 6 ml/h for shell-layer growth, where the injection time is 80 minutes.

34) After the cyclic reaction is completed, cooling the prepared CdS/CdSe/CdS QD solution to room temperature without any post-treatment.

4. Purifying the CdS/CdSe/CdS QDs.

Adding an appropriate amount of ethyl acetate and ethanol to the QD mixture prepared in step 3) to centrifuge the CdS/CdSe/CdS QD solution, dispersing the centrifuged CdS/CdSe/CdS QD solution again in an appropriate amount of chloroform solution, adding acetone and methanol to the solution for precipitation and centrifugal separation, and repeating this step once; and then vacuum drying the resulting CdS/CdSe/CdS QDs.

The CdS/CdSe/CdS QDs prepared according to the method of this example can reduce the generation of shell-layer defects, and the corresponding effect is that the fluorescence intensity of CdS/CdSe/CdS core-shell QDs can be improved. The quantum yield (QY) of the solution at room temperature is tested by the integrating sphere of a fluorescence spectrometer (Edinburgh-FS5), where the QY value ranges from 75% to 85%.

Embodiment 8

A preparation method for core-shell structure nanocrystals including the following steps:

1. Preparing cadmium selenide (CdSe) QD cores,
    11) Preparing a cadmium precursor: adding 0.25 mmol of CdO, 0.5 mmol of octadecylphosphonic acid, and 3 g of trioctylphosphine oxide together in a 50 ml three-necked flask, dissolving the mixture by heating to 380° C., the mixture becoming a clear and transparent solution, and keeping the mixture at this temperature;
    12) Preparing of a Se precursor: taking and stirring 0.5 mmol of a Se source solution and 1 ml of trioctylphosphine at room temperature until the mixture becomes clear, keeping the mixture for later use;
    13) Preparing CdSe initial QDs: injecting 1 ml of a trioctylphosphine solution into the solution prepared in step 11), and when the temperature of the solution returns to 380° C., injecting the Se precursor prepared in step 12) for 30 seconds, and then injecting 10 ml of octadecene to quench the reaction and cool to room temperature before cleaning;
    14) Cleaning and purifying CdSe initial QDs: adding 30 ml of acetone to the initial QD mixture to centrifuge the QDs, and dispersing the centrifuged CdSe initial QDs in 10 ml of n-hexane for later use.
2. Treating cadmium selenide (CdSe) initial QD cores,
    Dispersing CdSe initial QD cores: Taking 2 ml of the solution prepared in step 1) with CdSe initial QDs dispersed in n-hexane, adding it to a solution containing 1 ml of oleylamine and 10 ml of octadecene, heating the CdSe initial QD solution to 150° C. and venting for 20 minutes to remove the excessive n-hexane, and then raising the temperature of the CdSe solution to 300° C.
3. Preparing CdSe/CdS core-shell QDs,
    31) Preparing a CdS shell source: taking and dispersing 1 mmol of cadmium oleate precursor and 1.5 mmol of 1-dodecanethiol together in 10 ml of octadecene solution, stirring and heating at 80° C. to make the turbid liquid clear, and then cooling to room temperature for later use;
    32) Growing a CdS shell layer: dropping the CdS shell source prepared in step 31) into the CdSe initial QD core solution prepared in step 2) at a dropping rate of 6 ml/h for shell-layer growth, where the injection time is 80 minutes;
    33) After the cyclic shell-layer growth is completed, adding 5 mmol of oleic acid to the mixture, and performing an aging treatment at 300° C. for 60 minutes;
    34) After the cyclic reaction is completed, cooling the prepared CdSe/CdS QD solution to room temperature without any post-treatment.
4. Purifying CdSe/CdS core-shell QDs,
    Adding an appropriate amount of ethyl acetate and ethanol to the QD mixture prepared in step 3) to centrifuge the CdSe/CdS QD solution, dispersing the centrifuged CdSe/CdS QD solution again in an appropriate amount of chloroform solution, adding acetone and methanol to the solution for precipitation and centrifugal separation, and repeating this step once; and then vacuum drying the resulting CdSe/CdS QDs.

The CdSe/CdS QDs prepared according to the method of this example not only reduce the generation of shell defects during shell-layer growth but also reduce the defect states on the surface of the CdSe/CdS core-shell QDs. Further, the corresponding effect is that not only the fluorescence intensity of the CdSe/CdS core-shell QDs is improved but, at the same time, the transient fluorescence lifetime of the CdSe/CdS core-shell QDs is also extended; the quantum yield (QY) of the solution at room temperature is tested by the integrating sphere of a fluorescence spectrometer (Edinburgh-FS5) and the transient fluorescence lifetime of the CdSe/CdS core-shell QDs is tested by transient fluorescence spectroscopy, where the QY value ranges from 80% to 89%, and the lifetime value ranges from 25 ns to 30 ns.

Embodiment 9

A preparation method for core-shell structure nanocrystals including the following steps:

1. Preparing cadmium selenide (CdSe) QD cores,
    11) Preparing a cadmium precursor: adding 0.25 mmol of CdO, 0.5 mmol of octadecylphosphonic acid, and 3 g of trioctylphosphine oxide together in a 50 ml three-necked flask, dissolving the mixture by heating to 380° C., the mixture becoming a clear and transparent solution, and keeping the mixture at this temperature;
    12) Preparing of a Se precursor: taking and stirring 0.5 mmol of a Se source solution and 1 ml of trioctylphosphine at room temperature until the mixture becomes clear, keeping the mixture for later use;
    13) Preparing CdSe QDs: injecting 1 ml of a trioctylphosphine solution into the solution prepared in step 11), and when the temperature of the solution returns to 380° C., injecting the Se precursor prepared in step 12) for 30 seconds, and then injecting 10 ml of octadecene to quench the reaction and cool to room temperature before cleaning;
    14) Cleaning and purifying CdSe initial QDs: adding 30 ml of acetone to the initial QD mixture to centrifuge the QDs, and dispersing the centrifuged CdSe initial QDs in 10 ml of n-hexane for later use.
2. Treating cadmium selenide (CdSe) initial QD cores,
    Dispersing CdSe initial QD cores: Taking 2 ml of the solution prepared in step 1) with CdSe initial QDs dispersed in n-hexane, adding it to a solution containing 1 ml of oleylamine and 10 ml of octadecene, heating the CdSe initial QD solution to 150° C. and venting for 20 minutes to remove the excessive n-hexane, and then raising the temperature of the CdSe solution to 300° C.

3. Preparing CdSe/CdS core-shell QDs,
31) Preparing a CdS shell source: taking and dispersing 1 mmol of cadmium oleate precursor and 1.5 mmol of 1-dodecanethiol together in 10 ml of 1-octadecene solution, stirring and heating at 80° C. to make the turbid liquid clear, and then cooling to room temperature for later use;
32) Growing a CdS shell layer: dropping the CdS shell source prepared in step 31) into the CdSe QD core solution prepared in step 2) at a dropping rate of 6 ml/h for shell-layer growth, where the injection time is 80 minutes;
33) After the cyclic shell-layer growth is completed, adding 5 mmol of trioctylphosphine to the mixture, and performing an aging treatment at 300° C. for 60 minutes;
34) After the cyclic reaction is completed, cooling the prepared CdSe/CdS QD solution to room temperature without any post-treatment.
4. Purifying CdSe/CdS core-shell QDs,
Adding an appropriate amount of ethyl acetate and ethanol to the QD mixture prepared in step 3) to centrifuge the CdSe/CdS QD solution, dispersing the centrifuged CdSe/CdS QD solution again in an appropriate amount of chloroform solution, adding acetone and methanol to the solution for precipitation and centrifugal separation, and repeating this step once; and then vacuum drying the resulting CdSe/CdS QDs.

The CdSe/CdS QDs prepared according to the method of this example can further improve the fluorescence intensity of the QDs. The quantum yield (QY) of the CdSe/CdS solution at room temperature is tested by the integrating sphere of a fluorescence spectrometer (Edinburgh-FS5), where the QY value ranges from 78% to 88%.

Embodiment 10

A preparation method for core-shell structure nanocrystals including the following steps:
1. Preparing cadmium selenide (CdSe) QD cores,
11) Preparing a cadmium precursor: adding 0.25 mmol of CdO, 0.5 mmol of octadecylphosphonic acid, and 3 g of trioctylphosphine oxide together in a 50 ml three-necked flask, dissolving the mixture by heating to 380° C., the mixture becoming a clear and transparent solution, and keeping the mixture at this temperature;
12) Preparing of a Se precursor: taking and stirring 0.5 mmol of a Se source solution and 1 ml of trioctylphosphine at room temperature until the mixture becomes clear, keeping the mixture for later use;
13) Preparing CdSe QDs: injecting 1 ml of a trioctylphosphine solution into the solution prepared in step 11), and when the temperature of the solution returns to 380° C., injecting the Se precursor prepared in step 12) for 30 seconds, and then injecting 10 ml of octadecene to quench the reaction and cool to room temperature before cleaning;
14) Cleaning and purifying CdSe initial QDs: adding 30 ml of acetone to the QD mixture to centrifuge the QDs, and dispersing the centrifuged CdSe initial QDs in 10 ml of n-hexane for later use.
2. Treating cadmium selenide (CdSe) initial QD cores,
Dispersing CdSe initial QD cores: Taking 2 ml of the solution prepared in step 1) with CdSe initial QDs dispersed in n-hexane, adding it to a solution containing 1 ml of oleylamine and 10 ml of octadecene, heating the CdSe initial QD solution to 150° C. and venting for 20 minutes to remove the excessive n-hexane, and then raising the temperature of the CdSe solution to 300° C.

3. Preparing CdSe/CdS core-shell QDs,
31) Preparing a CdS shell source: taking and dispersing 1 mmol of cadmium oleate precursor and 1.5 mmol of 1-octadecanethiol together in 10 ml of octadecene solution, stirring and heating at 80° C. to make the turbid liquid clear, and then cooling to room temperature for later use;
32) Growing a CdS shell layer: dropping the CdS shell source prepared in step 31) into the CdSe QD core solution prepared in step 2) at a dropping rate of 6 ml/h for shell-layer growth, where the injection time is 80 minutes;
33) After the cyclic shell-layer growth is completed, adding a mixture of 1 ml of oleic acid and 2 mmol of tributylphosphine to the mixture, and performing an aging treatment at 300° C. for 60 minutes.
34) After the cyclic reaction is completed, cooling the prepared CdSe/CdS QD solution to room temperature without any post-treatment.
4. Purifying CdSe/CdS core-shell QDs,
Adding an appropriate amount of ethyl acetate and ethanol to the QD mixture prepared in step 3) to centrifuge the CdSe/CdS QD solution, dispersing the centrifuged CdSe/CdS QD solution again in an appropriate amount of chloroform solution, adding acetone and methanol to the solution for precipitation and centrifugal separation, and repeating this step once; and then vacuum drying the resulting CdSe/CdS QDs.

The CdSe/CdS QDs prepared according to the method of this example can improve the stability. The quantum yield (QY) of the solution at room temperature is tested after 30 days by the integrating sphere of a fluorescence spectrometer (Edinburgh-FS5), where the QY value ranges from 83% to 91%. The absorbance of the CdSe/CdS solution (a concentration of 0.05 mg/ml) is tested by a UV-visible fluorescence spectrometer, where the absorbance value ranges from 0.9 to 1.5.

The above are only the preferred embodiments of this application and are not intended to limit this application. Any modification, equivalent replacement, and improvement made within the spirit and principle of this application should be included in the protection scope of the present application.

What is claimed is:
1. A preparation method for quantum dots (QDs), comprising:
providing initial QD cores, and mixing the initial QD cores and an organic carboxylic acid according to a mass-molar ratio of 10 mg of the initial OD cores to (3~10) mmol of the organic carboxylic acid, and/or heating the initial QD cores with the organic carboxylic acid at a temperature condition of 80~150° C. for 20~60 minutes to bond the organic carboxylic acid to a surface of the initial QD cores;
preparing a shell layer on the surface of the initial QD cores in a shell-growth reaction system containing an organic carboxylic acid; and
mixing and heating a solution system, obtained after a completion of shell-layer growth reaction, with an organic amine an organic phosphine, or a mixed solution of the organic amine and the organic phosphine.

2. The method according to claim 1, wherein a source of the organic carboxylic acid in the shell-growth reaction system includes at least one of:
- remaining organic carboxylic acid after mixing the initial QD cores with the organic carboxylic acid to bond the organic carboxylic acid to the surface of the initial QD cores; and
- organic carboxylic acid added to the shell-growth reaction system during preparation of the shell layer on the surface of the initial QDs.

3. The method according to claim 1, wherein mixing and heating the solution system, obtained after the completion of the shell-layer growth reaction, with the organic amine include at least one of:
- mixing the solution system, obtained after the completion of the shell-layer growth reaction, and the organic amine according to a mass-molar ratio of 10 mg of the initial QD cores to (5~10) mmol of the organic amine; and
- mixing the solution system, obtained after the completion of the shell-layer growth reaction, and the organic amine under a temperature condition of 80~32° C. for 10~60 minutes.

4. The method according to claim 1, wherein mixing and heating the solution system, obtained after the completion of the shell-layer growth reaction, with the mixed solution of the organic amine and the organic phosphine include at least one of:
- mixing the solution system, obtained after the completion of the shell-layer growth reaction, and the mixed solution of the organic amine and the organic phosphine according to a mass-molar ratio of 10 mg of the QD cores to (5~10) mmol of the organic amine and a mass-molar ratio of 10 mg of the initial QD cores to (2-~5) mmol of the organic phosphine; and
- mixing the solution system, obtained after the completion of the shell-layer growth reaction, and the mixed solution of the organic amine and the organic phosphine under a temperature condition of 80~320° C. for 10~90 minutes.

5. The method according to claim 1, wherein mixing and heating the solution system, obtained after the completion of the shell-layer growth reaction, with the organic phosphine include at least one of:
- mixing the solution system, obtained after the completion of the shell-layer growth reaction, and the organic phosphine according to a lass-molar ratio of 10 mg of the QD cores to (2~5) mmol of the organic phosphine; and
- mixing the solution system, obtained after the completion of the shell-layer growth reaction, and the organic phosphine under a temperature condition of 100~320° C. for 10~60 minutes.

6. The method according to claim 1, wherein:
- the organic carboxylic acid is one or more selected from organic carboxylic acids having 8 to 18 carbon atoms; and/or
- the organic amine is one or more selected from organic amines having 8 to 18 carbon atoms; and/or
- the organic phosphine is at least one selected from trioctylphosphine and tributylphosphine.

7. The method according to claim 6, wherein:
- when the organic carboxylic acid is one or more selected from the organic carboxylic acids having 8 to 18 carbon atoms, the organic carboxylic acid is selected from linear organic acids containing a single carboxyl group; and/or
- when the organic amine is one or more selected from the organic amines having 8 to 18 carbon atoms, the organic amine is selected from linear organic amines containing a single amine group.

8. The method according to claim 7, wherein:
- when the organic carboxylic acid is selected from the linear organic acids containing a single carboxyl group, the organic carboxylic acid is at least one selected from oleic acid, dodecanoic acid, tetradecanoic acid, hexadecanoic acid, and octadecanoic acid; and/or
- when the organic amine is selected from the linear organic amines containing a single carboxyl group, the organic amine is at least one selected from oleylamine, trioctylamine, dodecylamine, tetradecylamine, hexadecylamine, and octadecylamine.

9. A quantum dot, prepared by the preparation method for QDs according to claim 1.

10. A preparation method for quantum dots (QDs), comprising:
- providing initial QD cores, and mixing the initial QD cores with an organic amine to bond the organic amine to a surface of the initial QD cores;
- performing a shell-layer growth reaction on the surface of the initial QD cores to prepare a shell layer on the initial QD cores; and
- mixing and heating a solution system, obtained after a Completion of the shell-layer growth reaction, with an organic carboxylic acid, an organic phosphine, or a mixed solution of the organic carboxylic acid and the organic phosphine.

11. The method according to claim 10, wherein mixing the initial QD cores with the organic amine to bond the organic amine to the surface of the initial QD cores includes at least one of:
- mixing the initial QD cores with the organic amine according to a mass-molar ratio of 10 mg of the QD cores to (3~10) mmol of the organic amine; and
- mixing the initial QD cores with the organic amine under a temperature condition of 80~150° C. for 20~60 minutes to bond the organic amine to the surface of the initial QD cores.

12. The method according to claim 10, wherein mixing and heating the solution system, obtained after the completion of the shell-layer growth reaction, with the mixed solution of the organic carboxylic acid and the organic phosphine include at least one of:
- mixing the solution system, obtained after the completion of the shell-layer growth reaction, and the mixed solution of the organic carboxylic acid and the organic phosphine according to a mass-molar ratio of 10 mg of the initial QD cores to (5~10) mmol of the organic carboxylic acid and a mass-molar ratio of 10 mg of the initial QD cores to (2~5) mmol of the organic phosphine; and
- mixing the solution system, obtained after the completion of the shell-layer growth reaction, and the mixed solution of the organic carboxylic acid and the organic phosphine under a temperature condition of 100~320° C. for 10~60 minutes.

13. The method according to claim 10, wherein mixing and Beating the solution system, obtained after the completion of the shell-layer growth reaction, with the organic carboxylic acid include at least one of:
- mixing the solution system, obtained after the completion of the shell-layer growth reaction, and the organic carboxylic acid according to a mass-molar ratio of 10 mg of the initial QD cores to (5~10) mmol of the organic carboxylic acid; and mixing the solution system, obtained after the completion of the shell-layer growth reaction, and the organic carboxylic acid at a temperature condition of 240~320° C. for 30~90 minutes.

14. The method according to claim 10, wherein nixing and heating the solution system, obtained after the completion of the shell-layer growth reaction, with the organic phosphine include at least one of:

mixing the solution system, obtained after the completion of the shell-layer growth reaction, and the organic phosphine according to a mass-molar ratio of 10 mg of the initial QD cores to (2~5) mmol of the organic phosphine; and mixing the solution system, obtained after the completion of the shell-layer growth reaction, and the organic phosphine under a temperature condition of 100~320° C. for 10~60 minutes.

15. The method according to claim 10, wherein:

the organic carboxylic acid is one or more selected from organic carboxylic acids having 8 to 18 carbon atoms; and/or the organic amine is one or more selected from organic amines having 8 to 18 carbon atoms; and/or the organic phosphine is at least one selected from trioctylphosphine and tributylphosphine.

16. The method according to claim 15, wherein:

when the organic carboxylic acid is one or more selected from the organic carboxylic acids having 8 to 18 carbon atoms, the organic carboxylic acid is selected from linear organic acids containing a single carboxyl group; and/or when the organic amine is one or more selected from the organic amines having 8 to 18 carbon atoms, the organic amine is selected from linear organic amines containing a single group.

17. The method according to claim 16, wherein:

when the organic carboxylic acid is selected from the linear organic acids containing a single carboxyl group, the organic carboxylic acid is at least one selected from oleic acid, dodecanoic acid, tetradecanoic acid, hexadecanoic acid, and octadecanoic acid; and/or when the organic amine is selected from the linear organic amines containing a single carboxyl group, the organic amine is at least one selected from oleylamine, trioctylamine, dodecylamine, tetradecylamine, hexadecylamine, and octadecylamine.

18. A quantum dot, prepared by the preparation method for QDs according to claim 10.

* * * * *